(12) United States Patent
Nishino

(10) Patent No.: US 9,021,235 B2
(45) Date of Patent: Apr. 28, 2015

(54) DATA PROCESSING DEVICE

(75) Inventor: Kengo Nishino, Tokyo (JP)

(73) Assignee: NEC Corporation, Tokyo (JP)

( * ) Notice: Subject to any disclaimer, the term of this patent is extended or adjusted under 35 U.S.C. 154(b) by 607 days.

(21) Appl. No.: 13/390,653

(22) PCT Filed: Apr. 6, 2010

(86) PCT No.: PCT/JP2010/056228
§ 371 (c)(1),
(2), (4) Date: Feb. 15, 2012

(87) PCT Pub. No.: WO2011/024504
PCT Pub. Date: Mar. 3, 2011

(65) Prior Publication Data
US 2012/0144184 A1 Jun. 7, 2012

(30) Foreign Application Priority Data

Aug. 25, 2009 (JP) .................................. 2009-194074

(51) Int. Cl.
*G06F 9/38* (2006.01)
*G06F 15/78* (2006.01)

(52) U.S. Cl.
CPC .......... *G06F 9/3897* (2013.01); *G06F 15/7867* (2013.01)

(58) Field of Classification Search
CPC combination set(s) only.
See application file for complete search history.

(56) References Cited

U.S. PATENT DOCUMENTS

2003/0046513 A1* 3/2003 Furuta et al. .................... 712/15
2003/0061601 A1* 3/2003 Toi et al. ........................ 717/144
2006/0095649 A1* 5/2006 Netter et al. ................... 711/103
2009/0119491 A1* 5/2009 Nishino et al. ................ 712/221

FOREIGN PATENT DOCUMENTS

| JP | 08-088629 | 4/1996 |
|----|-----------|--------|
| JP | 2000-138579 | 5/2000 |
| JP | 2000-224025 | 8/2000 |
| JP | 2000-232162 | 8/2000 |
| JP | 2000-232354 | 8/2000 |
| JP | 2001-312481 | 11/2001 |
| JP | 2003-076668 | 3/2003 |
| JP | 2003-099409 | 4/2003 |
| JP | 2005-100448 | 4/2005 |
| JP | 2005-222141 | 8/2005 |
| JP | 2005-222142 | 8/2005 |
| JP | 2008-152409 | 7/2008 |
| WO | WO 2007/114059 | 10/2007 |

OTHER PUBLICATIONS

Hideharu Amano, Akiya Jouraku, Kenichiro Anjo, "A Dynamically Adaptive Hardware on Dynamically Reconfigurable Processor," IEICE Transactions, vol. E86-B, No. 12, pp. 3385-3391, 2003.
International Search Report, PCT/JP2010/056228, May 18, 2010.

* cited by examiner

*Primary Examiner* — Eric Coleman
(74) *Attorney, Agent, or Firm* — Young & Thompson

(57) ABSTRACT

A statue management section of a control section is provided with a corresponding real number storage section that stores a real number converted from a logical number by a configuration number converting section. When the corresponding real number storage section has stored configuration information with a real number of the next transition state, the state management section directly supplies the real number to the configuration information storage section in the next or later processing cycle.

19 Claims, 30 Drawing Sheets

Fig.8

| REAL NUMBER | EVENT SIGNAL | | | | | |
|---|---|---|---|---|---|---|
| | | A | B | C | D | E |
| 0 | upper | 1 | - | - | - | - |
| | lower | 1 | | | | |
| 1 | upper | 0 | 2 | - | - | - |
| | lower | 0 | INVALID | | | |
| 2 | upper | - | - | - | - | - |
| | lower | | | | | |
| 3 | upper | - | - | - | - | - |
| | lower | | | | | |
| 4 | upper | - | - | - | - | - |
| | lower | | | | | |
| 5 | upper | - | - | - | - | - |
| | lower | | | | | |
| 6 | upper | - | - | - | - | - |
| | lower | | | | | |
| 7 | upper | - | - | - | - | - |
| | lower | | | | | |

UPPER: NEXT LOGICAL NUMBER

LOWER: CORRESPONDING REAL NUMBER STORAGE SECTION

Fig.9

| REAL NUMBER | LOGICAL NUMBER |
|---|---|
| 0 | 0 |
| 1 | 1 |
| 2 | - |
| 3 | - |
| 4 | - |
| 5 | - |
| 6 | - |
| 7 | - |

Fig.11A

| REAL NUMBER | EVENT SIGNAL | | | | |
|---|---|---|---|---|---|
| | A | B | C | D | E |
| 0 | 1 | - | - | - | - |
| | INVALID | | | | |
| 1 | 2 | - | - | - | - |
| | INVALID | | | | |
| 2 | - | - | - | - | - |
| | | | | | |
| 3 | - | - | - | - | - |
| | | | | | |
| 4 | - | - | - | - | - |
| | | | | | |
| 5 | - | - | - | - | - |
| | | | | | |
| 6 | - | - | - | - | - |
| | | | | | |
| 7 | - | - | - | - | - |
| | | | | | |

CURRENT REAL NUMBER → 0

| REAL NUMBER | LOGICAL NUMBER |
|---|---|
| 0 | 0 |
| 1 | 1 |
| 2 | - |
| 3 | - |
| 4 | - |
| 5 | - |
| 6 | - |
| 7 | - |

Fig.11B

| REAL NUMBER | EVENT SIGNAL | | | | |
|---|---|---|---|---|---|
| | A | B | C | D | E |
| 0 | 1 | - | - | - | - |
| | 1 | | | | |
| 1 | 2 | - | - | - | - |
| | INVALID | | | | |
| 2 | - | - | - | - | - |
| | | | | | |
| 3 | - | - | - | - | - |
| | | | | | |
| 4 | - | - | - | - | - |
| | | | | | |
| 5 | - | - | - | - | - |
| | | | | | |
| 6 | - | - | - | - | - |
| | | | | | |
| 7 | - | - | - | - | - |
| | | | | | |

CURRENT REAL NUMBER → 1

| REAL NUMBER | LOGICAL NUMBER |
|---|---|
| 0 | 0 |
| 1 | 1 |
| 2 | - |
| 3 | - |
| 4 | - |
| 5 | - |
| 6 | - |
| 7 | - |

Fig.11C

| REAL NUMBER | EVENT SIGNAL | | | | |
|---|---|---|---|---|---|
| | A | B | C | D | E |
| 0 | 1 | - | - | - | - |
| | 1 | | | | |
| 1 | 2 | - | - | - | - |
| | 2 | | | | |
| 2 ← CURRENT REAL NUMBER | 3 | 4 | 5 | - | - |
| | 3 | INVALID | INVALID | | |
| 3 | 3 | 6 | - | - | - |
| | 3 | 4 | | | |
| 4 | 6 | 10 | - | - | - |
| | 4 | 5 | | | |
| 5 | 10 | 12 | - | - | - |
| | 5 | 6 | | | |
| 6 | 13 | 2 | - | - | - |
| | INVALID | 2 | | | |
| 7 | - | | | | |

| REAL NUMBER | LOGICAL NUMBER |
|---|---|
| 0 | 0 |
| 1 | 1 |
| 2 | 2 |
| 3 | 3 |
| 4 | 6 |
| 5 | 10 |
| 6 | 12 |
| 7 | - |

Fig.11D

| REAL NUMBER | EVENT SIGNAL | | | | |
|---|---|---|---|---|---|
| | A | B | C | D | E |
| 0 | 1 | - | - | - | - |
| | 1 | | | | |
| 1 | 2 | - | - | - | - |
| | 2 | | | | |
| 2 ← CURRENT REAL NUMBER | 3 | 4 | 5 | - | - |
| | 3 | INVALID | INVALID | | |
| 3 | 3 | 6 | - | - | - |
| | 3 | 4 | | | |
| 4 | 6 | 10 | - | - | - |
| | 4 | 5 | | | |
| 5 | 10 | 12 | - | - | - |
| | 5 | 6 | | | |
| 6 | 13 | 2 | - | - | - |
| | 7 | 2 | | | |
| 7 | 0 | 1 | - | - | - |
| | 0 | INVALID | | | |

| REAL NUMBER | LOGICAL NUMBER |
|---|---|
| 0 | 0 |
| 1 | 1 |
| 2 | 2 |
| 3 | 3 |
| 4 | 6 |
| 5 | 10 |
| 6 | 12 |
| 7 | 13 |

Fig.11E

| REAL NUMBER | EVENT SIGNAL | | | | |
|---|---|---|---|---|---|
| | A | B | C | D | E |
| 0 | 4 | 7 | 8 | - | - |
| | INVALID | INVALID | INVALID | | |
| 1 | 2 | - | - | - | - |
| | 2 | | | | |
| 2 | 3 | 4 | 5 | - | - |
| | 3 | INVALID | INVALID | | |
| 3 | 3 | 6 | - | - | - |
| | 3 | 4 | | | |
| 4 | 6 | 10 | - | - | - |
| | 4 | 5 | | | |
| 5 | 10 | 12 | - | - | - |
| | 5 | 6 | | | |
| 6 | 13 | 2 | - | - | - |
| | 7 | 2 | | | |
| 7 | 0 | 1 | - | - | - |
| | INVALID | INVALID | | | |

CURRENT REAL NUMBER → 2

| REAL NUMBER | LOGICAL NUMBER |
|---|---|
| 0 | 4 |
| 1 | 1 |
| 2 | 2 |
| 3 | 3 |
| 4 | 6 |
| 5 | 10 |
| 6 | 12 |
| 7 | 13 |

Fig.14

| REAL NUMBER | EVENT SIGNAL | | | | |
|---|---|---|---|---|---|
| | A | B | C | D | E |
| 0 | 1-1 | - | - | - | - |
| | 1 | | | | |
| 1 | 0-1 | 2-1 | - | - | - |
| | 0 | INVALID | | | |
| 2 | - | - | - | - | - |
| | | | | | |
| 3 | - | - | - | - | - |
| | | | | | |
| 4 | - | - | - | - | - |
| | | | | | |
| 5 | - | - | - | - | - |
| | | | | | |
| 6 | - | - | - | - | - |
| | | | | | |
| 7 | - | - | - | - | - |
| | | | | | |

UPPER:
NEXT LOGICAL NUMBER –
NEXT INTERNAL STATE NUMBER

LOWER:
CORRESPONDING REAL
NUMBER STORAGE SECTION

1
INTERNAL STATE 1 IN
LOGICAL NUMBER

2
LOGICAL NUMBER 1

Fig.16A

| REAL NUMBER | EVENT SIGNAL | | | | |
|---|---|---|---|---|---|
| | A | B | C | D | E |
| 0 | 0-2 INVALID | 2-1 INVALID | - | - | - |
| 1 | - | - | - | - | - |
| 2 | - | - | - | - | - |
| 3 | - | - | - | - | - |
| 4 | - | - | - | - | - |
| 5 | - | - | - | - | - |
| 6 | - | - | - | - | - |
| 7 | - | - | - | - | - |

↑ CURRENT REAL NUMBER

| REAL NUMBER | LOGICAL NUMBER |
|---|---|
| 0 | 0 |
| 1 | - |
| 2 | - |
| 3 | - |
| 4 | - |
| 5 | - |
| 6 | - |
| 7 | - |

Fig.16C

| REAL NUMBER | LOGICAL NUMBER |
|---|---|
| 0 | 0 |
| 1 | 2 |
| 2 | . |
| 3 | . |
| 4 | . |
| 5 | . |
| 6 | . |
| 7 | . |

| REAL NUMBER | EVENT SIGNAL | | | | |
|---|---|---|---|---|---|
| | A | B | C | D | E |
| 0 | 0-2 | 2-1 | . | . | . |
| 1 | 0 | 1 | . | . | . |
| 2 | 3-1 | 4-1 | 5-1 | . | . |
| 3 | INVALID | INVALID | INVALID | . | . |
| 4 | . | . | . | . | . |
| 5 | . | . | . | . | . |
| 6 | . | . | . | . | . |
| 7 | . | . | . | . | . |

↑ CURRENT REAL NUMBER

Fig.16D

| REAL NUMBER | EVENT SIGNAL | | | | |
|---|---|---|---|---|---|
| | A | B | C | D | E |
| 0 | 0-2 | 2-1 | . | . | . |
| 1 | 0 | 1 | . | . | . |
| 2 | 3-1 | 4-1 | 5-1 | . | . |
| | 2 | INVALID | INVALID | . | . |
| | 3-1 | 6-1 | . | . | . |
| | INVALID | INVALID | . | . | . |
| 3 | . | . | . | . | . |
| 4 | . | . | . | . | . |
| 5 | . | . | . | . | . |
| 6 | . | . | . | . | . |
| 7 | . | . | . | . | . |

↑ CURRENT REAL NUMBER (pointing to row 2)

| REAL NUMBER | LOGICAL NUMBER |
|---|---|
| 0 | 0 |
| 1 | 2 |
| 2 | 3 |
| 3 | . |
| 4 | . |
| 5 | . |
| 6 | . |
| 7 | . |

Fig.16E

| REAL NUMBER | LOGICAL NUMBER |
|---|---|
| 0 | 0 |
| 1 | 2 |
| 2 | 3 |
| 3 | - |
| 4 | - |
| 5 | - |
| 6 | - |
| 7 | - |

| REAL NUMBER | EVENT SIGNAL | | | | |
|---|---|---|---|---|---|
| | A | B | C | D | E |
| 0 | 0-2 | 2-1 | - | - | - |
| 1 | 0 | 1 | - | - | - |
| 2 | 3-1 | 4-1 | 5-1 | - | - |
| 3 | 2 | INVALID | INVALID | - | - |
| 4 | 3-1 | 6-1 | - | - | - |
| 5 | 2 | INVALID | - | - | - |
| 6 | - | - | - | - | - |
| 7 | - | - | - | - | - |

↑ CURRENT REAL NUMBER (at row 2)

Fig.16F

| REAL NUMBER | LOGICAL NUMBER |
|---|---|
| 0 | 0 |
| 1 | 2 |
| 2 | 3 |
| 3 | 6 |
| 4 | 10 |
| 5 | 1 |
| 6 | - |
| 7 | - |

| REAL NUMBER | EVENT SIGNAL | | | | |
|---|---|---|---|---|---|
| | A | B | C | D | E |
| 0 | 0-2 | 2-1 | - | - | - |
| 1 | 0 | 1 | - | - | - |
| 2 | 3-1 | 4-1 | 5-1 | - | - |
| | 2 | INVALID | INVALID | | |
| 3 | 3-1 | 6-1 | - | - | - |
| | 2 | 3 | | | |
| 4 | 6-1 | 10-1 | - | - | - |
| | 3 | 4 | | | |
| 5 | 10-1 | 1-1 | - | - | - |
| | 4 | 5 | | | |
| 6 | 2-1 | 1-2 | 0-2 | 0-1 | - |
| | 1 | INVALID | INVALID | INVALID | |
| 7 | - | - | - | - | - |

↑ CURRENT REAL NUMBER

Fig.16G

| REAL NUMBER | LOGICAL NUMBER |
|---|---|
| 0 | 0 |
| 1 | 2 |
| 2 | 3 |
| 3 | 6 |
| 4 | 10 |
| 5 | 1 |
| 6 | - |
| 7 | - |

| REAL NUMBER | EVENT SIGNAL | | | | |
|---|---|---|---|---|---|
| | A | B | C | D | E |
| 0 | 0-2 | 2-1 | - | - | - |
| 1 | 0 | 1 | - | - | - |
| | 3-1 | 4-1 | 5-1 | - | - |
| 2 | 2 | INVALID | INVALID | - | - |
| | 3-1 | 6-1 | - | - | - |
| | 2 | 3 | - | - | - |
| 3 | 6-1 | 10-1 | - | - | - |
| | 3 | 4 | - | - | - |
| 4 | 10-1 | 1-1 | - | - | - |
| | 4 | 5 | - | - | - |
| 5 | 2-1 | 1-2 | 0-2 | 0-1 | - |
| | 1 | 5 | INVALID | INVALID | - |
| 6 | - | - | - | - | - |
| 7 | - | - | - | - | - |

↑ CURRENT REAL NUMBER (at row 5)

Fig.16H

| REAL NUMBER | EVENT SIGNAL | | | | |
|---|---|---|---|---|---|
| | A | B | C | D | E |
| 0 | 0-2 | 2-1 | . | . | . |
| 1 | 0 | 1 | . | . | . |
| 2 | 3-1 | 4-1 | 5-1 | . | . |
|   | 2 | INVALID | INVALID | . | . |
| 3 | 3-1 | 6-1 | . | . | . |
|   | 2 | 3 | . | . | . |
| 4 | 6-1 | 10-1 | . | . | . |
|   | 3 | 4 | . | . | . |
| 5 | 10-1 | 1-1 | . | . | . |
|   | 4 | 5 | . | . | . |
|   | 2-1 | 1-2 | 0-2 | 0-1 | . |
|   | 1 | 5 | 0 | 0 | . |
| 6 | . | . | . | . | . |
| 7 | . | . | . | . | . |

↑ CURRENT REAL NUMBER

| REAL NUMBER | EVENT SIGNAL |
|---|---|
| 0 | 0 |
| 1 | 2 |
| 2 | 3 |
| 3 | 6 |
| 4 | 10 |
| 5 | 1 |
| 6 | . |
| 7 | . |

Fig.16

| REAL NUMBER | EVENT SIGNAL | | | | |
|---|---|---|---|---|---|
| | A | B | C | D | E |
| 0 | 0-2 | 2-1 | - | - | - |
| 1 | 0 | 1 | - | - | - |
| | 3-1 | 4-1 | 5-1 | - | - |
| | 2 | 6 | INVALID | - | - |
| 2 | 3-1 | 6-1 | - | - | - |
| | 2 | 3 | - | - | - |
| 3 | 6-1 | 10-1 | - | - | - |
| | 3 | 4 | - | - | - |
| 4 | 10-1 | 1-1 | - | - | - |
| | 4 | 5 | - | - | - |
| 5 | 2-1 | 1-2 | 0-2 | 0-1 | - |
| | 1 | 5 | 0 | 0 | - |
| 6 | 4-1 | 7-1 | 8-1 | - | - |
| | 6 | 7 | INVALID | - | - |
| 7 | 10-1 | - | - | - | - |
| | 4 | | | | |

CURRENT REAL NUMBER ↑

| REAL NUMBER | LOGICAL NUMBER |
|---|---|
| 0 | 0 |
| 1 | 2 |
| 2 | 3 |
| 3 | 6 |
| 4 | 10 |
| 5 | 1 |
| 6 | 4 |
| 7 | 7 |

Fig.16J

| REAL NUMBER | EVENT SIGNAL | | | | |
|---|---|---|---|---|---|
| | A | B | C | D | E |
| 0 | 0-2 / 0 | 2-1 / 1 | - | - | - |
| 1 ← CURRENT REAL NUMBER | 3-1 / 2 | 4-1 / 6 | 5-1 / INVALID | - | - |
| 2 | 3-1 / 2 | 6-1 / 3 | - | - | - |
| 3 | 6-1 / 3 | 10-1 / INVALID | - | - | - |
| 4 | 11-1 / INVALID | - | - | - | - |
| 5 | 2-1 / 1 | 1-2 / 5 | 0-2 / 0 | 0-1 / 0 | - |
| 6 | 4-1 / 6 | 7-1 / 7 | 8-1 / INVALID | - | - |
| 7 | 10-1 / INVALID | - | - | - | - |

| REAL NUMBER | LOGICAL NUMBER |
|---|---|
| 0 | 0 |
| 1 | 2 |
| 2 | 3 |
| 3 | 6 |
| 4 | 8 |
| 5 | 1 |
| 6 | 4 |
| 7 | 7 |

Fig.16K

| REAL NUMBER | LOGICAL NUMBER |
|---|---|
| 0 | 0 |
| 1 | 2 |
| 2 | 3 |
| 3 | 11 |
| 4 | 8 |
| 5 | 1 |
| 6 | 4 |
| 7 | 7 |

| REAL NUMBER | EVENT SIGNAL | | | | |
|---|---|---|---|---|---|
| | A | B | C | D | E |
| 0 | 0-2 | 2-1 | - | - | - |
| 1 | 0 | 1 | - | - | - |
| 2 | 3-1 | 4-1 | 5-1 | - | - |
| | 2 | 6 | INVALID | | |
| 3 | 3-1 | 6-1 | - | - | - |
| | 2 | INVALID | | | |
| 4 | 11-1 | 1-1 | - | - | - |
| | INVALID | 5 | | | |
| 5 | 11-1 | - | - | - | - |
| | INVALID | | | | |
| 6 | 2-1 | 1-2 | 0-2 | 0-1 | - |
| | 1 | 5 | 0 | 0 | |
| 7 | 4-1 | 7-1 | 8-1 | - | - |
| | 6 | 7 | 4 | | |
| | 10-1 | - | - | - | - |
| | INVALID | | | | |

CURRENT REAL NUMBER →

Fig.16L

| REAL NUMBER | EVENT SIGNAL | | | | |
|---|---|---|---|---|---|
| | A | B | C | D | E |
| 0 | 0-2 | 2-1 | - | - | - |
| 1 | 0 | 1 | - | - | - |
| 2 | 3-1 | 4-1 | 5-1 | - | - |
| | 2 | 6 | INVALID | - | - |
| 3 | 3-1 | 6-1 | - | - | - |
| | 2 | INVALID | - | - | - |
| 4 | 11-1 | 1-1 | - | - | - |
| | 3 | 5 | - | - | - |
| 5 | 10-1 | - | - | - | - |
| | INVALID | - | - | - | - |
| 6 | 2-1 | 1-2 | 0-2 | 0-1 | - |
| | 1 | 5 | 0 | 0 | - |
| 7 | 4-1 | 7-1 | 8-1 | - | - |
| | 6 | 7 | INVALID | - | - |
| | 10-1 | - | - | - | - |
| | INVALID | - | - | - | - |

CURRENT REAL NUMBER → (row 1)

| REAL NUMBER | LOGICAL NUMBER |
|---|---|
| 0 | 0 |
| 1 | 2 |
| 2 | 3 |
| 3 | 11 |
| 4 | 6 |
| 5 | 1 |
| 6 | 4 |
| 7 | 7 |

Fig.16M

| REAL NUMBER | LOGICAL NUMBER |
|---|---|
| 0 | 0 |
| 1 | 2 |
| 2 | 3 |
| 3 | 10 |
| 4 | 6 |
| 5 | 1 |
| 6 | 4 |
| 7 | 7 |

| REAL NUMBER | EVENT SIGNAL | | | | |
|---|---|---|---|---|---|
| | A | B | C | D | E |
| 0 | 0-2 | 2-1 | - | - | - |
| | 0 | 1 | - | - | - |
| 1 | 3-1 | 4-1 | 5-1 | - | - |
| | 2 | 6 | INVALID | - | - |
| 2 | 3-1 | 6-1 | - | - | - |
| | 2 | INVALID | - | - | - |
| 3 | 11-1 | 1-1 | - | - | - |
| | INVALID | 5 | - | - | - |
| 4 | 10-1 | - | - | - | - |
| | 3 | - | - | - | - |
| 5 | 2-1 | 1-2 | 0-2 | 0-1 | - |
| | 1 | 5 | 0 | 0 | - |
| 6 | 4-1 | 7-1 | 8-1 | - | - |
| | 6 | 7 | INVALID | - | - |
| 7 | 10-1 | - | - | - | - |
| | INVALID | - | - | - | - |

CURRENT REAL NUMBER

DATA PROCESSING DEVICE

TECHNICAL FIELD

The present invention relates to data processing device composed of a reconfigurable device that is capable of changing circuits that execute predetermined processes.

BACKGROUND ART

Information processing devices have been used in a wide range of applications and there is an increasing demand that such devices form advanced computation processes and have capabilities for processing large amounts of data such as still images and moving images at high speeds. As a technique that satisfies such demands, a structure that is provided with a DSP (Digital Signal Processor), an ASIC (Application Specific Integrated Circuit), or the like that dedicatedly executes particular computations and processes besides a host processor and thereby reduces the load imposed on the processes of the host processor such as a CPU and improves the processing capabilities of information processing device is known.

However, information processing device that have appeared in recent years need to perform compression/decompression processes, computation processes, and so forth based on a variety of standards for multimedia data such as still images, moving images, sound, and music and communication processes that transmit and receive a variety of types of data through a network such as the Internet based on a variety of protocols have been used. In addition, since there is concern about the safety of information transmitted and received over the network, an encryption process that secures information, and a decryption process that restores original information, and so forth are required. Thus, if information processing devices are provided with many DSPs, ASICs, and so forth corresponding to these processes, the circuit scale and cost would become huge.

Thus, a structure in which information processing devices are provided with data processing devices composed of a reconfigurable device such as an FPGA (Field Programmable Gate Array), a CPLD (Complex Programmable Logic Device) or a DRP (Dynamically Reconfigurable Processor) and a program stored in the data processing device that is rewritten and executed when necessary so as to improve the throughput of the information processing device and deal with a variety of processes at low cost has been contemplated.

The reconfigurable device is provided with an internal memory that stores a program (object code), loads an object code stored in an external memory to the internal memory under the control of a CPU or the like, configures an internal circuit corresponding to the loaded object code, and executes a process for data that are input to the circuit.

Details of DRPs are presented, for example, in Patent Literatures 1 to 6 and Non-patent Literature 1. DRPs are structured to have a computation section that executes a computation process and a control section that controls the operation of the computation section. The computation section is provided with a plurality of small-scale computation units and an interconnect section that changes these connections so as to execute a variety of processes by changing instruction codes supplied to the computation units and interconnect section.

DRPs can execute a variety of processes. For example, DRPs may read data from a memory during the execution of a process and then continue the process using such data. Although DRPs are provided with an internal memory, the storage capacity may be limitedly small. Thus, when DRPs execute a process and refer to a table or data that need a large storage capacity of memory, they need to access the memory that stores them. This processing method is presented, for example, in Patent Literature 7 and Patent Literature 8.

When the foregoing background art data processing device executes a process corresponding to an object code composed of at least one piece of configuration information generated corresponding to data to be processed, the device uses a technique that directly specifies the location of configuration information stored therein and executes the process.

In this context, configuration information is information that is necessary to virtually structure a circuit in a data processing device and that includes computational instructions for computation units at particular time points, information that represents the relationship between the connections of the individual computation units in the interconnect section, information that represents the relationship between event signals and configuration information to be selected next, and so forth. An object code is a set of configuration information that is necessary to execute a desired process.

However, in such a method, if a plurality of object codes are installed in data processing device and storage locations of configuration information of these object code overlap, they need to be synthesized such that they do not overlap.

In addition, if a plurality of object codes or a large scale object code is installed in the data processing device and thereby the number of pieces of configuration information exceeds the maximum value that the data processing device can store, it needs to, for example, stop the operation, replace a stored object code with another one, and restart the operation. To do that, an external processing device such as an MPU is required. However, since the background art data processing device can only install configuration information at a location decided when the object code was synthesized, if configuration information composed of the same functional code needs to be installed at different locations, a plurality of sets of configuration information composed of the same functional code needs to be prepared. In this case, since configuration information cannot be shared, a data processing device needs to store a plurality of sets of same configuration information or a process will occur in which the same configuration information is rewritten, the process of the device becomes slow as a problem of the background art device.

To solve such a problem, the applicant of the present invention has proposed a data processing device that does not restrict storage destinations of configuration information and that allows configuration information to be shared (the data processing device filed as Japanese Patent Application No. 2006-103987, hereinafter referred to as Prior Art Invention 1).

In this Prior Art Invention 1, in addition to the foregoing control section, the data processing device is provided with an auxiliary control section that controls state transitions in a predetermined group whose scale is smaller than that of state transitions that the control section controls such that the control section controls state transitions between the groups and the auxiliary control section controls state transitions in each group. In the structure where control structures are hierarchically formed, since the auxiliary control section can control state transitions more quickly than does the control section, the applicant insists that the prior art data processing device can execute processes at higher speeds than does ordinal data processing device.

However, when object codes are actually generated from applications and the operations of data processing device corresponding to the object codes are verified, the result shows that the control section often controls state transitions depending on applications.

In this case, since the chance in which the control source of state transitions that change from the auxiliary control section to the control section increases and the changing time also increases, the process time of the entire data processing device may become longer than that of the structure that does not have the auxiliary control structure. In other words, the process time of data processing device having a hierarchical control configuration may be longer than that of data processing device having a non-hierarchical control structure.

To solve such a problem, the applicant of the present invention has proposed a data processing device having a structure in which the required operation time is shortened in such a manner that the control section controls state transitions simultaneously with the operation of the computation section (the data processing device filed as Japanese Patent Application No. 2008-215764, hereinafter referred to as Prior Art Invention 2).

However, in Prior Art Invention 2, since the control section cannot control state transitions simultaneously with the operation of the computation section if each state has many branches, the device according to this invention slightly reduces the required operation time. In addition, when the device is provided with the auxiliary control section, the entire control of the data processing device becomes complicated.

Moreover, the applicant of the present invention has proposed a data processing device that uses object codes to which logical numbers and real numbers have been allocated and that causes the state management section to hold the next logical number and the next real number so as to realize a large-scale object code having pieces of configuration information that exceed those that parallel computation device can have without a configuration number converting section (the data processing device filed as Japanese Patent Application No. 2009-019561, hereinafter referred to as Prior Art Invention 3).

However, in Prior Art Invention 3, since logical numbers and real numbers are pre-allocated to object codes, when a process is executed, the location of configuration information is restricted and thereby the performance of the data processing device may deteriorate. In addition, while configuration information is being written, unless all the next logical numbers and the next real numbers have been rewritten in the state management section, the operation of the computation section cannot be resumed. Thus, when configuration information of the transition destination from many states is written, the rewritten overhead of the state management section becomes a problem of this prior art invention.

RELATED ART LITERATURE

Patent Literature

Patent Literature 1: Japanese Patent Laid-Open No. 2000-138579;
Patent Literature 2: Japanese Patent Laid-Open No. 2000-224025;
Patent Literature 3: Japanese Patent Laid-Open No. 2000-232354;
Patent Literature 4: Japanese Patent Laid-Open No. 2000-232162;
Patent Literature 5: Japanese Patent Laid-Open No. 2003-076668;
Patent Literature 6: Japanese Patent Laid-Open No. 2003-099409;
Patent Literature 7: Japanese Patent Laid-Open No. 2005-222141; and
Patent Literature 8: Japanese Patent Laid-Open No. 2005-222142.

Non-Patent Literature

Non-patent Literature 1: Hideharu Amano, Akiya Jouraku, Kenichiro Anjo, "A Dynamically Adaptive Hardware on Dynamically Reconfigurable Processor," IEICE Transactions, Vol. E86-B, No. 12, pp. 3385-3391, 2003.

SUMMARY

It is therefore an exemplary object of the present invention is to provide a data processing device that allows the required operation time to decrease as compared to the background art.

To accomplish the foregoing object, a data processing device according to an exemplary aspect of the present invention is a data processing device that includes a plurality of computation units and an interconnect section that changes connections of said computation units and that is capable of changing circuits that execute a variety of processes corresponding to an object code composed of at least one piece of configuration information containing information that represents the relationship between computation instructions for said computation units and connections of said computation units, including:

a state management section that decides a logical number that represents information of the mutual relationship between individual pieces of configuration information contained in said object code, the logical number being used in the next operation state, based on a current operation state, a candidate group of a next transition state, and an event signal issued by each of said computation units;

a configuration number converting section that stores converting information based on which said logical number is converted into a real number that represents a real storage location of said configuration information corresponding to said logical number and that outputs a real number corresponding to a logical number decided by said state management section;

a configuration information storage section that stores said configuration information and notifies said computation units and said interconnect section of configuration information corresponding to a real number that is output from said configuration number converting section; and a corresponding real number storage section that stores a real number corresponding to a logical number along with information that represents validity, the logical number being decided by said state management section based on the current operation state, the candidate group of the next transition state, and the event signal issued by each of said computation units.

BRIEF DESCRIPTION OF DRAWINGS

FIG. 8 is a schematic diagram showing an example of a look-up table which is used by a state transition management section according to the first example to decide the next logical number.

FIG. 9 is a schematic diagram showing an example of a look-up table based on which a configuration number converting section according to the first example converts a logical number into a real number.

FIG. 11A is a schematic diagram showing an example of a look-up table with which the state transition management section is provided and a look-up table that the configuration number converting section uses when an operation is performed corresponding to the state transition chart shown in FIG. 10.

FIG. 11B is a schematic diagram showing an example of a look-up table with which the state transition management section is provided and a look-up table that the configuration number converting section uses when an operation is performed corresponding to the state transition chart shown in FIG. 10.

FIG. 11C is a schematic diagram showing an example of a look-up table with which the state transition management section is provided and a look-up table that the configuration number converting section uses when an operation is performed corresponding to the state transition chart shown in FIG. 10.

FIG. 11D is a schematic diagram showing an example of a look-up table with which the state transition management section is provided and a look-up table that the configuration number converting section uses when an operation is performed corresponding to the state transition chart shown in FIG. 10.

FIG. 11E is a schematic diagram showing an example of a look-up table with which the state transition management section is provided and a look-up table that the configuration number converting section uses when an operation is performed corresponding to the state transition chart shown in FIG. 10.

FIG. 14 is a schematic diagram showing an example of a look-up table that a state transition management section according to the second example uses to decide the next logical number.

FIG. 16A is a schematic diagram showing an example of a look-up table with which the state transition management section is provided and a look-up table that the configuration number converting section uses when an operation is performed corresponding to the state transition chart shown in FIG. 15.

FIG. 16C is a schematic diagram showing an example of a look-up table with which the state transition management section is provided and a look-up table that the configuration number converting section uses when an operation is performed corresponding to the state transition chart shown in FIG. 15.

FIG. 16D is a schematic diagram showing an example of a look-up table with which the state transition management section is provided and a look-up table that the configuration number converting section uses when an operation is performed corresponding to the state transition chart shown in FIG. 15.

FIG. 16E is a schematic diagram showing an example of a look-up table with which the state transition management section is provided and a look-up table that the configuration number converting section uses when an operation is performed corresponding to the state transition chart shown in FIG. 15.

FIG. 16F is a schematic diagram showing an example of a look-up table with which the state transition management section is provided and a look-up table that the configuration number converting section uses when an operation is performed corresponding to the state transition chart shown in FIG. 15.

FIG. 16G is a schematic diagram showing an example of a look-up table with which the state transition management section is provided and a look-up table that the configuration number converting section uses when an operation is performed corresponding to the state transition chart shown in FIG. 15.

FIG. 16H is a schematic diagram showing an example of a look-up table with which the state transition management section is provided and a look-up table that the configuration number converting section uses when an operation is performed corresponding to the state transition chart shown in FIG. 15.

FIG. 16I is a schematic diagram showing an example of a look-up table with which the state transition management section is provided and a look-up table that the configuration number converting section uses when an operation is performed corresponding to the state transition chart shown in FIG. 15.

FIG. 16J is a schematic diagram showing an example of a look-up table with which the state transition management section is provided and a look-up table that the configuration number converting section uses when an operation is performed corresponding to the state transition chart shown in FIG. 15.

FIG. 16K is a schematic diagram showing an example of a look-up table with which the state transition management section is provided and a look-up table that the configuration number converting section uses when an operation is performed corresponding to the state transition chart shown in FIG. 15.

FIG. 16L is a schematic diagram showing an example of a look-up table with which the state transition management section is provided and a look-up table that the configuration number converting section uses when an operation is performed corresponding to the state transition chart shown in FIG. 15.

FIG. 16M is a schematic diagram showing an example of a look-up table with which the state transition management section is provided and a look-up table that the configuration number converting section uses when an operation is performed corresponding to the state transition chart shown in FIG. 15.

EXEMPLARY EMBODIMENT

Next, with reference to the accompanied drawings, the present invention will be described.

First Exemplary Embodiment

Figure 1:
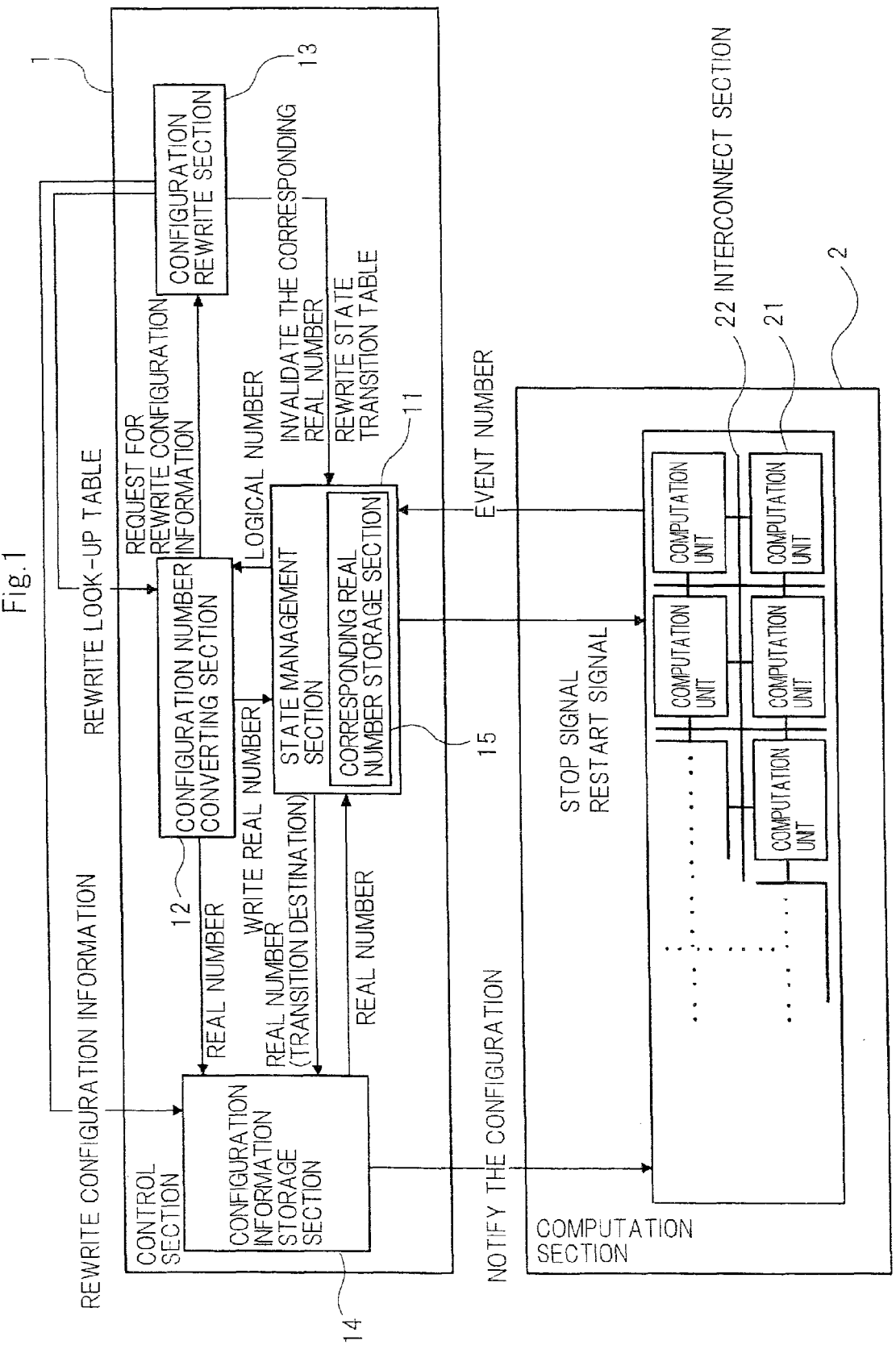
FIG. 1 is a block diagram showing the structure of a data processing device according to a first exemplary embodiment.

FIG. 1 is a block diagram showing the structure of a data processing device according to the first exemplary embodiment.

Hereinafter, it is assumed that a logical number represents information of the mutual relationship between pieces of configuration information contained in an object code, whereas a real number represents the storage location of each piece of configuration information that is actually stored in a configuration information storage section 13.

As shown in FIG. 1, the data processing device according to this exemplary embodiment is structured to include a control section 1 and a computation section 2.

The control section 1 is provided with a state management section 11, a configuration number converting section 12, a configuration information storage section 14, and the configuration rewrite section 13. The computation section 2 is provided with a plurality of computation units 21 and an interconnect section 22 that connects the plurality of computation units 21.

The state management section 11 decides a logical number of pieces of configuration information that is used in the next operation state with reference to a prepared state transition table based on the current operation state and the next transition state candidate group (transition destination candidate group) contained in configuration information and an event signal that is sent from the computation section 2 and that notifies the configuration number converting section 12 of the decided logical number.

A logical number is information that represents the mutual relationship between individual pieces of configuration information contained in an object code. A real storage location of configuration information stored in the configuration rewrite section 13 is identified by a real number.

The state management section 11 according to this exemplary embodiment is provided with a corresponding real number storage section 15. The corresponding real number storage section 15 temporarily stores a real number and information that denotes whether it is valid or invalid. The state management section 11 tries to read a real number from the corresponding real number storage section 15 based on a logical number of pieces of configuration information that currently lies in the operation state and an event signal that is sent from the computation section 2. When the state management section 11 has read a valid real number from the corresponding real number storage section 15, the state management section 11 notifies the configuration information storage section 14 of the real number. In contrast, if the state management section 11 reads information that represents an invalid value from the corresponding real number storage section 15, the state management section 11 notifies the configuration number converting section 12 of the corresponding logical number and stops the operation of the computation section 2.

In addition, when the state management section 11 is notified of a real number by the configuration number converting section 12, the state management section 11 writes the real number to a predetermined storage location of the corresponding real number storage section 15 and stores information that denotes that the real number is valid to the storage location.

The configuration number converting section 12 converts a logical number of pieces of configuration information notified by the state management section 11 into a real number with reference to a prepared look-up table and notifies the configuration information storage section 14 and the state management section 11 of the real number. If the configuration number converting section 12 fails to convert the logical number into a real number, since the configuration information storage section 14 has not stored necessary configuration information, the configuration number converting section 12 notifies the configuration rewrite section 13 of the logical number such that the configuration rewrite section 13 rewrites configuration information stored in the configuration information storage section 14.

When the data processing device initially gets started, the configuration rewrite section 13 writes configuration information to the configuration rewrite section 13, writes the status transition table to the state management section 11, and writes the look-up table to the configuration number converting section 12.

In addition, when the configuration number converting section 12 requests the configuration rewrite section 13 to rewrite configuration information, the configuration rewrite section 13 decides a real number of unnecessary configuration information items at the current time from configuration information stored in the configuration information storage section 14 and invalidates the entry of the corresponding real number storage section 15 that stores the decided real number. Moreover, the configuration rewrite section 13 rewrites configuration information identified by the real number with specified configuration information requested by the configuration information storage section 14. Furthermore, the configuration rewrite section 13 updates both the transition destination candidate group of the real number stored in the state management section 11 and converting information necessary for the converting process that converts a logical number into a real number stored in the configuration number converting section 12. Unnecessary configuration information can be selected by using a known method such as the LRU (Least Recently Used) method.

Although the configuration rewrite section 13 basically rewrites only one specified piece of configuration information while the configuration number converting section 12 requests the configuration rewrite section 13 to rewrite configuration information, the configuration rewrite section 13 may rewrite configuration information that may be used thereafter along with the specified configuration information. In this case, the configuration rewrite section 13 invalidates an entry with an unnecessary real number of the corresponding real number storage section 15 at this point and rewrites the transition destination candidate group stored in the state management section 11 and the converting information necessary for the converting process that converts a logical number into a real number stored in the configuration number converting section 12.

The configuration information storage section 14 stores a plurality of pieces of configuration information. When the configuration information storage section 14 is notified of a real number by the state management section 11, the configuration number converting section 12, or the configuration rewrite section 13, the configuration information storage section 14 holds the notified real number. The configuration information storage section 14 reads configuration information corresponding to the real number that it holds and notifies the computation section 2 of configuration information. In addition, the configuration information storage section 14 notifies the state management section 11 of the real number that the configuration information storage section 14 holds.

Read from the corresponding real number storage section 15 based on the transition destination candidate group and an event signal sent from the computation section 2 is the real number of pieces of configuration information that is used in the next operation state and information that denotes whether the real number is valid or invalid. In addition, provided in the corresponding real number storage section 15 is a function that searches for a specified real number and invalidates all detected entries.

The computation section 2 executes a computation process using the computation units 21 based on configuration information notified by the configuration information storage section 14 in each of the operation states that successively transit. In addition, the computation section 2 outputs an event signal that occurs in a computation process to the state management section 11 of the control section 1.

The interconnect section 22 changes the relationship between the connections of the plurality of the computation units 21 based on configuration information notified by the configuration information storage section 14.

Each structural component of data processing device shown in FIG. 1 does not need to be independently provided corresponding to each function shown in FIG. 1; instead, any structural component may be contained in another structural component or any structural component may be composed of a plurality of parts. For example, the configuration information storage section 14 may be composed of a memory (not shown) with which the computation units 21 and the interconnect section 22 each are provided. Alternatively, all structural components of the data processing device shown in FIG. 1 may not be provided in one device. For example, the configuration rewrite section 13 may be realized by an external device, an external MPU, or the like.

As described above, configuration information is information necessary to virtually structure a circuit in the data processing device and contains computational instructions for the computation units 21 at particular time points, information that represents the relationship between the connections of the computation units 21 performed by the interconnect section 22, event signals, information that represents the relationship between the event signals and configuration information to be selected next corresponding to the event signals, and so forth. An object code is a set of configuration information necessary to execute a desired process.

The computation unit 21 may have a structure provided with a so-called arithmetic logical unit (ALU) or a structure in which a plurality of types of computation units and storage elements such as registers are combined.

The state management section 11 may be structured in any manner as long as it can decide a state that should transit next based on the current state and an event signal. For example, the state management section 11 may be regarded as having a structure provided with a look-up table that represents transitions among individual states.

Likewise, the configuration number converting section 12 may be structured in any manner as long as it can convert a logical number of pieces of configuration information specified by the state management section 11 into a real number. The configuration number converting section 12 may be provided with a look-up table that represents the relationship between logical numbers and real numbers or a function that converts a logical number into a real number based on their relative values. In this exemplary embodiment, the foregoing look-up table, correlative values, and so forth necessary for a process that converts a logical number into a real number performed by the configuration number converting section 12 are generically referred to as "converting information."

The required conditions for the foregoing individual structural components are applied not only to the first exemplary embodiment, but also to the following second exemplary embodiment to sixth exemplary embodiment, and the following first example to third example.

In the data processing device according to this exemplary embodiment, since the state management section 11 is provided with the corresponding real number storage section 15 that temporarily holds a real number and information that denotes whether it is valid or invalid, in the initial transition after configuration information of both a transition source and a transition destination is written, a real number of configuration information that is used in the next operation state is invalid and thereby the configuration number converting section 12 needs to perform the converting process that converts a logical number into a real number.

However, in the second and later transitions, the corresponding real number storage section 15 holds a valid real number of configuration information that is used in the next operation state. Thus, the data processing device according to this exemplary embodiment can reduce the required operation time, as compared to the data processing device presented in Prior Art Inventions 1 and 2.

On the other hand, in the data processing device presented in Prior Art Invention 3, when configuration information is written, all real numbers are written to the configuration information storage section 14 and then the operation of the computation section 2 is resumed; in the data processing device according to this exemplary embodiment, when configuration information is written, information of a real number is not written to configuration information storage section 14; instead, when necessary, the configuration number converting section 12 performs the converting process that converts a logical number into a real number and then the real number is written to the corresponding real number storage section 15. Thus, the data processing device according to this exemplary embodiment can reduce the required operation time even as compared to the data processing device presented in Prior Art Invention 3.

Second Exemplary Embodiment

Figure 2:
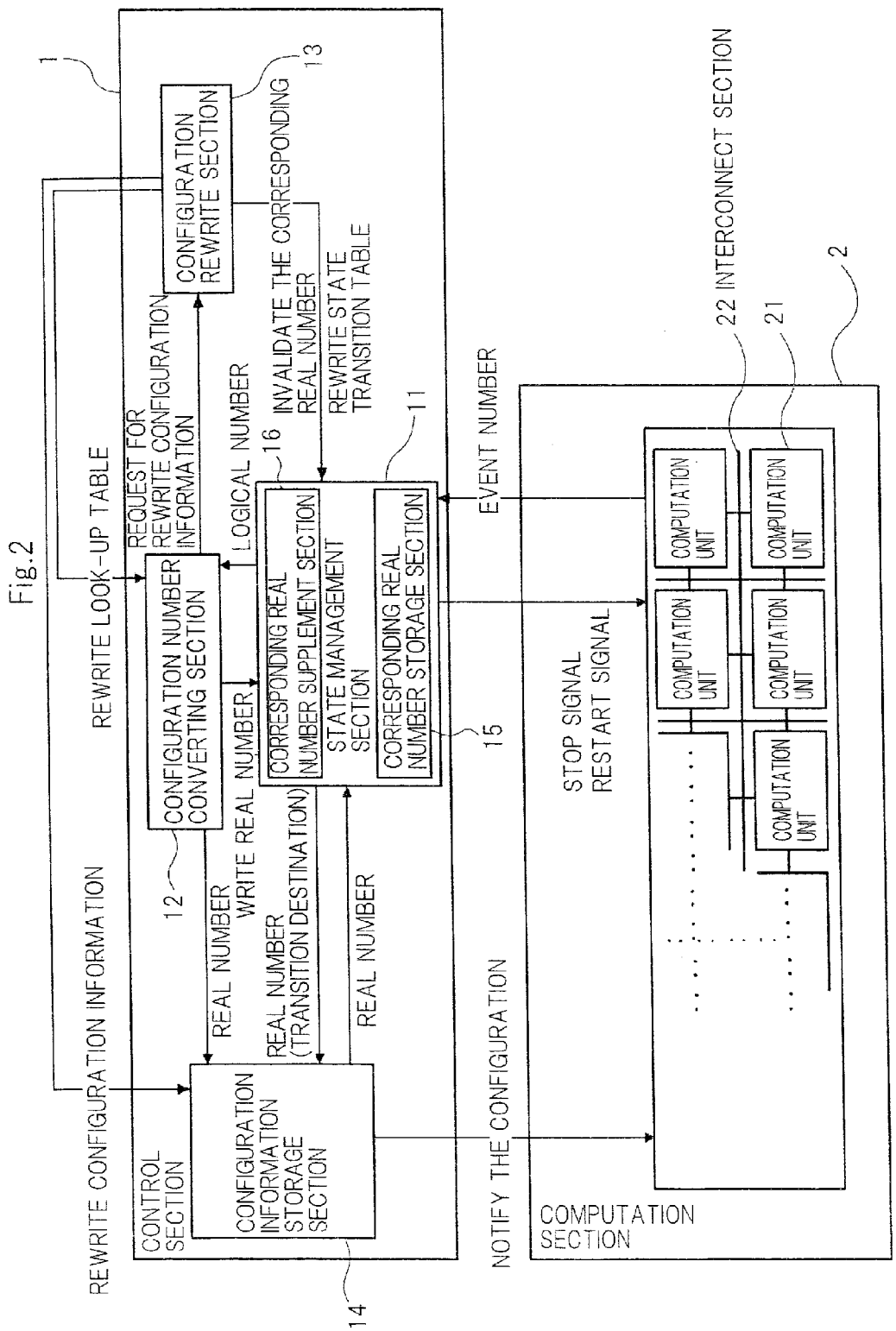
FIG. 2 is a block diagram showing the structure of a data processing device according to a second exemplary embodiment.

FIG. 2 is a block diagram showing the structure of a data processing device according to a second exemplary embodiment.

The data processing device according to the second exemplary embodiment has a structure in which the state management section 11 is provided with the corresponding real number storage section 15 according to the first exemplary embodiment and a corresponding real number supplement section 16.

While the computation section 2 is operating, the corresponding real number supplement section 16 notifies the configuration number converting section 12 of a logical number of an invalid entry stored in the corresponding real number storage section 15 of the transition destination candidate group stored in the state management section 11. When the configuration number converting section 12 notifies the corresponding real number supplement section 16 of a real number corresponding to the logical number, the corresponding real number supplement section 16 writes the real number to a predetermined storage location of the corresponding real number storage section 15 and stores information that denotes that the real number is valid to the storage location.

In the foregoing operation, if the configuration number converting section 12 fails to perform the converting process that converts a logical number into a real number, since it means that configuration information of the transition destination has not been stored in the configuration information storage section 14, the entry in the corresponding real number storage section 15 is kept invalid. If configuration information stored in the configuration information storage section 14 is permitted to be rewritten while the computation section 2 is operating, the configuration rewrite section 13 may be requested to rewrite configuration information. Except for the foregoing description, since the structure and operation of each of the control section 1 and the computation section 2 are the same as those of the data processing device according to the first exemplary embodiment, their description will be omitted.

In the data processing device according to this exemplary embodiment, since the state management section 11 is provided with the corresponding real number storage section 15 and the corresponding real number supplement section 16, even in the initial transition after configuration information of both a transition source and a transition destination is written to the configuration information storage section 14, while the computation section 2 is operating, a logical number of pieces of configuration information that is used in the next operation state is converted into a real number and it becomes valid. As a result, the required operation time of the data processing device according to this exemplary embodiment can be decreased as compared to the data processing device according to the first exemplary embodiment.

On the other hand, if configuration information stored in the configuration information storage section 14 is permitted to be rewritten while the computation section 2 is operating, since configuration information of a transition destination can be successively written to the configuration information storage section 14 while the computation section 2 is operating for a long time, the required operation time of the data processing device according to this exemplary embodiment can be decreased as compared to the background art data processing device in which configuration information stored in the configuration information storage section 14 is written on demand.

Third Exemplary Embodiment

Figure 3:
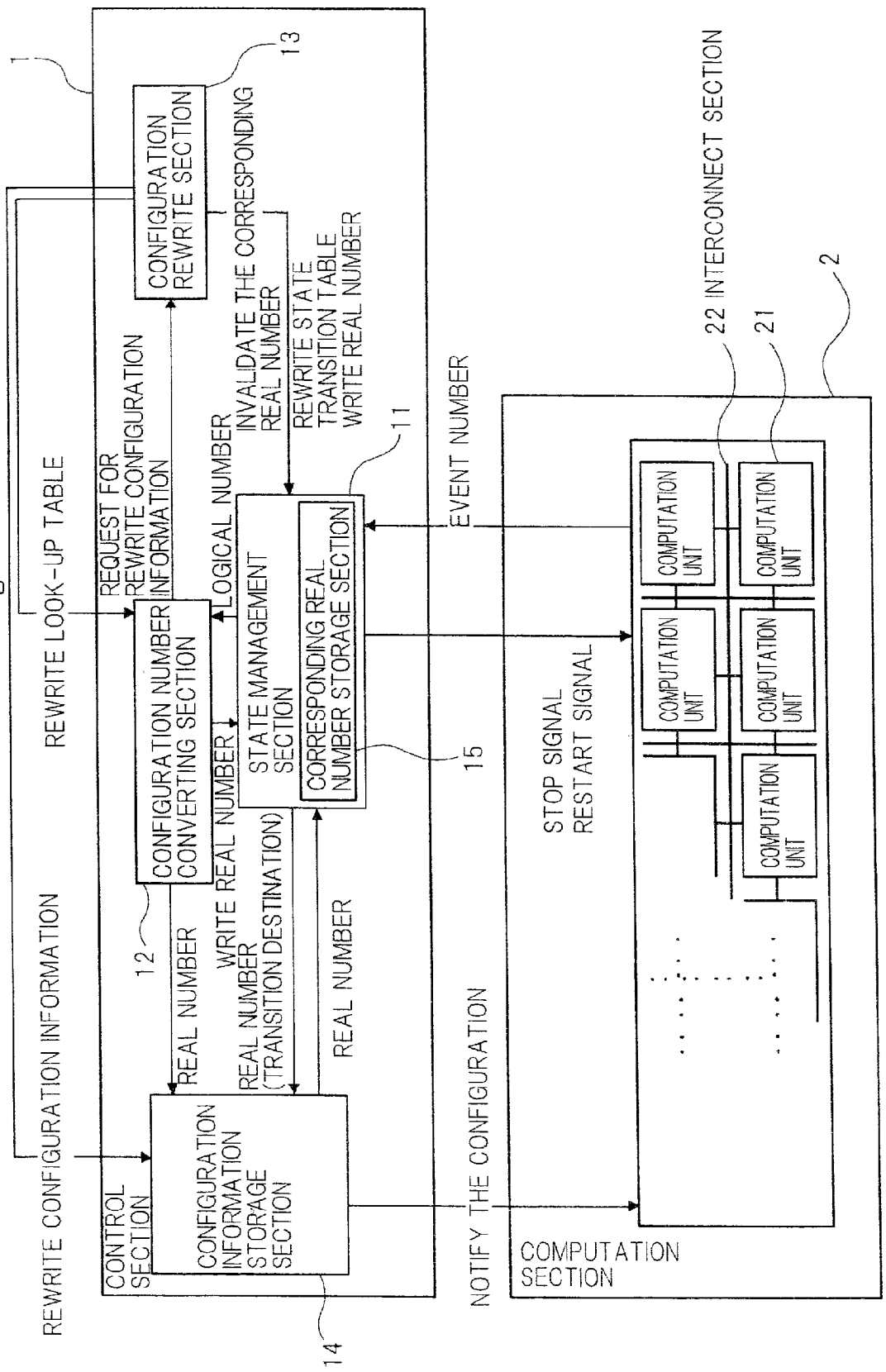
FIG. 3 is a block diagram showing the structure of a data processing device according to a third exemplary embodiment.

FIG. 3 is a block diagram showing the structure of a data processing device according to a third exemplary embodiment.

The data processing device according to the third exemplary embodiment is different from the data processing device according to the first exemplary embodiment in that the configuration rewrite section 13 invalidates an entry of the corresponding real number storage section 15 and writes a real number to the storage location.

After the configuration rewrite section 13 rewrites specified configuration information corresponding to a rewrite request issued from the configuration number converting section 12, the configuration rewrite section 13 invalidates an entry with a real number to be rewritten of the corresponding real number storage section 15, and rewrites both a transition destination candidate group stored in the state management section 11 and converting information that the configuration number converting section 12 needs to perform the converting process that converts a logical number into a real number. Thereafter, the computation section 2 resumes the operation. When the real number corresponding to the logical number of the transition destination of the rewritten configuration information is valid, the configuration rewrite section 13 writes the real number to a predetermined storage location of the corresponding real number storage section 15 and stores information that denotes that the real number is valid to the storage location.

In addition, the configuration rewrite section 13 writes a real number to a predetermined location (entry) that represents the transition destination of the rewritten configuration information of the corresponding real number storage section 15 and stores information that denotes that the real number is valid to the storage location. Except for the foregoing description, since the structure and operation of each of the control section 1 and the computation section 2 are the same as those of the data processing device according to the first exemplary embodiment, their description will be omitted.

In the data processing device according to this exemplary embodiment, since the configuration rewrite section 13 invalidates an entry of the corresponding real number storage section 15 and writes a real number to the storage location, even in the initial transition after configuration information of both a transition source and a transition destination is written, while the computation section 2 is operating, a logical number of pieces of configuration information used in the next operation state is converted to a real number and it becomes valid. As a result, the required operation time of the data processing device according to this exemplary embodiment can be decreased as compared to the first exemplary embodiment.

When the configuration information storage section 14 is permitted to be rewritten while the computation section 2 is operating, since configuration information of the transition destination can be successfully written to the configuration information storage section 14, while the computation section 2 is operating for a long time, the required operation time can be decreased as compared to the background art data processing device in which configuration information stored in the configuration information storage section 14 is rewritten on demand.

Fourth Exemplary Embodiment

Figure 4:
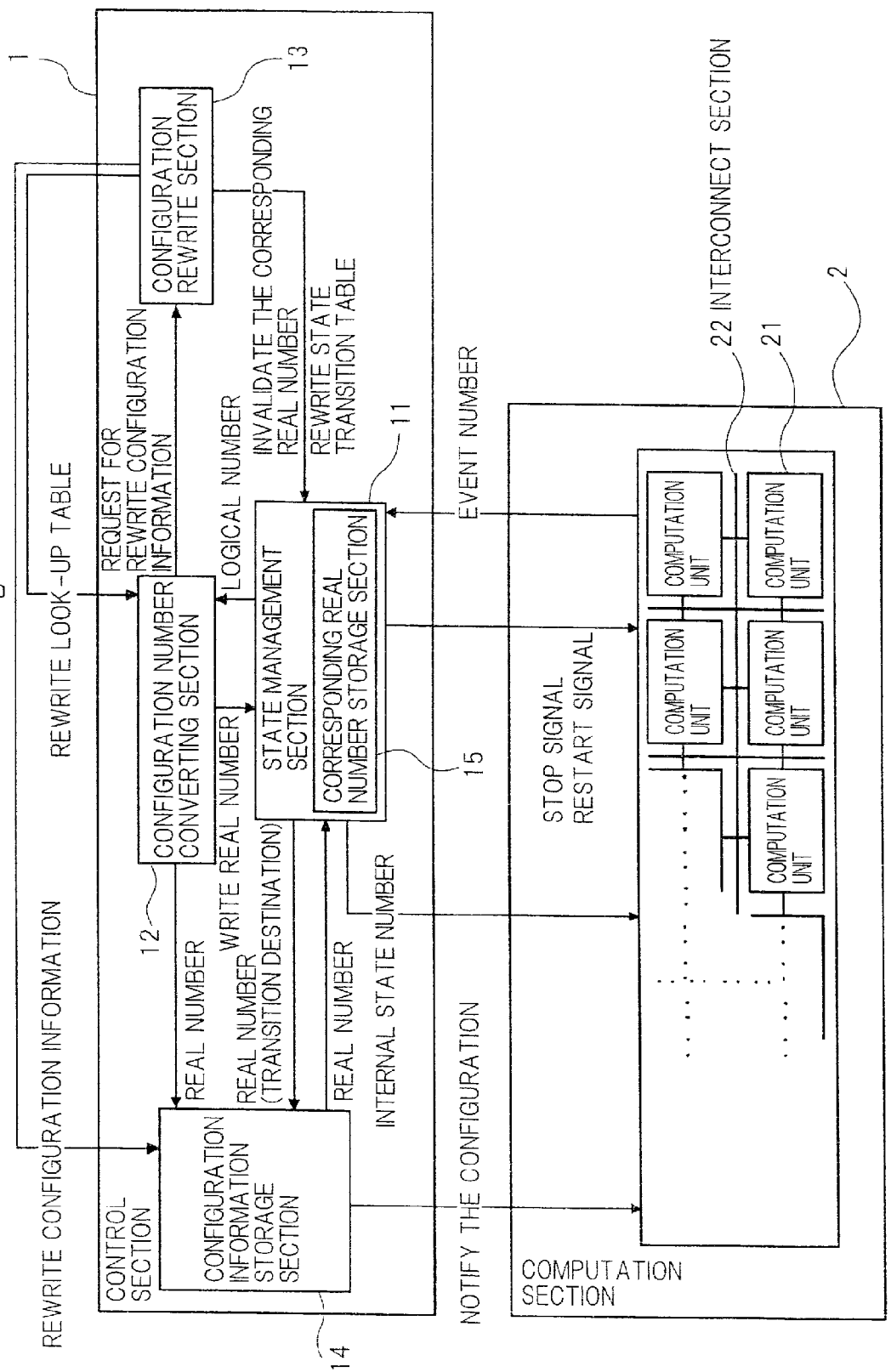
FIG. 4 is a block diagram showing the structure of a data processing device according to a fourth exemplary embodiment.

FIG. 4 is a block diagram showing the structure of a data processing device according to a fourth exemplary embodiment.

The data processing device according to the fourth exemplary embodiment is different from the data processing device according to the first exemplary embodiment in that the state management section 11 manages internal state numbers along with logical numbers and notifies the computation section 2 of internal state numbers.

The state management section 11 decides both a logical number of pieces of configuration information used in the next operation state and an internal state number based on the current operation state and an candidate group of the next transition state (transition destination candidate group) contained in configuration information and an event signal sent from the computation section 2 and notifies the computation section 2 of the internal state number.

In addition, the state management section 11 according to this exemplary embodiment is provided with the corresponding real number storage section 15. The state management section 11 tries to read a real number from the corresponding real number storage section 15 based on the current operation state and the event signal sent from the computation section 2. When the state management section 11 has read a valid real number from the corresponding real number storage section 15, the state management section 11 notifies the configuration information storage section 14 of the real number. In contrast, when the state management section 11 has read information that represents invalid from the corresponding real number storage section 15, the state management section 11 notifies the configuration number converting section 12 of the corresponding logical number and stops the operation of the computation section 2.

When the state management section 11 is notified of the real number by the configuration number converting section 12, the state management section 11 writes the real number to a predetermined storage location of the corresponding real number storage section 15 and stores information that denotes that the real number is valid to the storage location.

The computation section 2 executes a computation process corresponding to configuration information notified by the configuration information storage section 14 in each of a plurality of operation states that successively transits. At this point, the computation section 2 uses an internal state number notified by the state management section 11 for the computation process. In addition, the computation section 2 issues an event signal that occurs in the computation process to the state management section 11 of the control section 1.

The interconnect section 22 changes the relationship between the connections of the plurality of computation units 21 based on configuration information notified by the configuration information storage section 14. Except for the foregoing description, since the structure and operation of each of the control section 1 and the computation section 2 are the same as those of the data processing device according to the first exemplary embodiment, their description will be omitted.

In the data processing device according to this exemplary embodiment, since the state management section 11 manages logical numbers and internal state numbers in such a manner that they are separated, logical numbers are converted to real numbers, and the computation section 2 is notified of internal state numbers, a process corresponding to an object code that transits to many states can be performed, as compared to the data processing device according to the first exemplary embodiment.

Fifth Exemplary Embodiment

Figure 5:
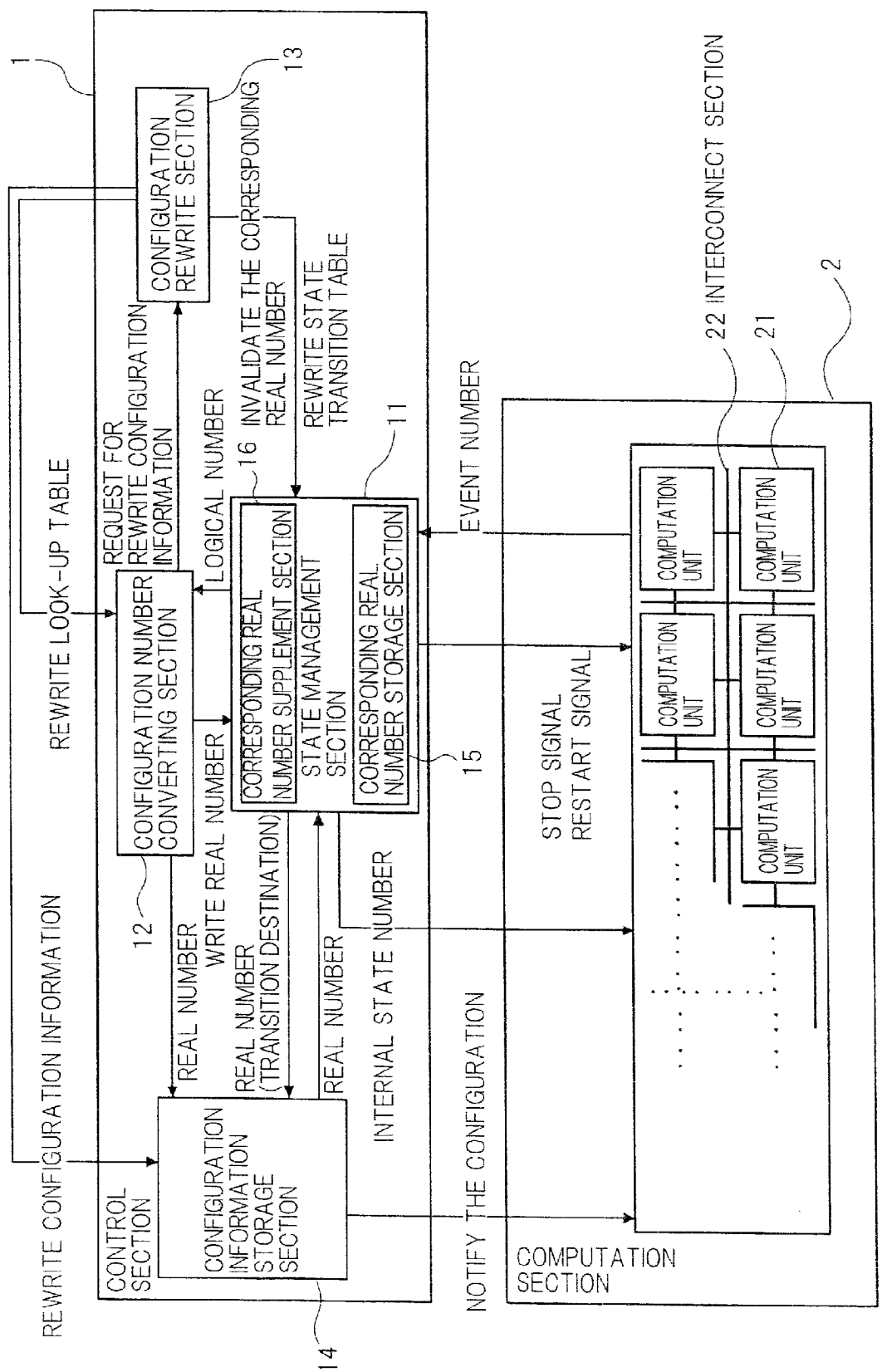
FIG. 5 is a block diagram showing the structure of a data processing device according to a fifth exemplary embodiment.

FIG. 5 is a block diagram showing the structure of a data processing device according to a fifth exemplary embodiment of the present invention.

The data processing device according to the fifth exemplary embodiment is different from the data processing device according to the fourth exemplary embodiment in that the state management section 11 is provided with the corresponding real number storage section 15 and the corresponding real number supplement section 16.

While the computation section 2 is operating, the corresponding real number supplement section 16 notifies the configuration number converting section 12 of a logical number of an invalid entry of the corresponding real number storage section 15 of a transition destination candidate group stored in the state management section 11. When the corresponding real number supplement section 16 is notified of a real number by the configuration number converting section 12, the corresponding real number supplement section 16 writes the real number to a predetermined storage location of the corresponding real number storage section 15 and stores information that denotes that the real number is valid into the storage location. If the configuration number converting section 12 failed to convert a logical number into a real number, since the configuration information storage section 14 has not stored configuration information of a transition destination, the entry of the corresponding real number storage section 15 is kept invalid.

While the computation section 2 is operating, if configuration information stored in the configuration information storage section 14 is permitted to be rewritten in this stage, a rewrite request may be issued to the configuration rewrite section 13. Except for the foregoing description, since the structure and operation of each of the control section 1 and the computation section 2 are the same as those of the data processing device according to the fourth exemplary embodiment, their description will be omitted.

In the data processing device according to this exemplary embodiment, since the state management section 11 is provided with the corresponding real number storage section 15 and the corresponding real number supplement section 16, even in the initial transition after configuration information of both a transition source and a transition destination is written to the configuration information storage section 14, while the computation section 2 is operating, a logical number of pieces of configuration information that is used in the next operation state is converted into a real number and it becomes valid. As a result, the required operation time of the data processing device according to this exemplary embodiment can be decreased as compared to the data processing device according to the first exemplary embodiment.

On the other hand, if configuration information stored in the configuration information storage section 14 is permitted to be rewritten while computation section 2 is operating, since configuration information of a transition destination can be successively written into the configuration information storage section 14 while the computation section 2 is operating for a long time, the required operation time of the data processing device according to this exemplary embodiment can be decreased as compared to the background art data processing device in which configuration information stored in the configuration information storage section 14 is written on demand.

Sixth Exemplary Embodiment

Figure 6:
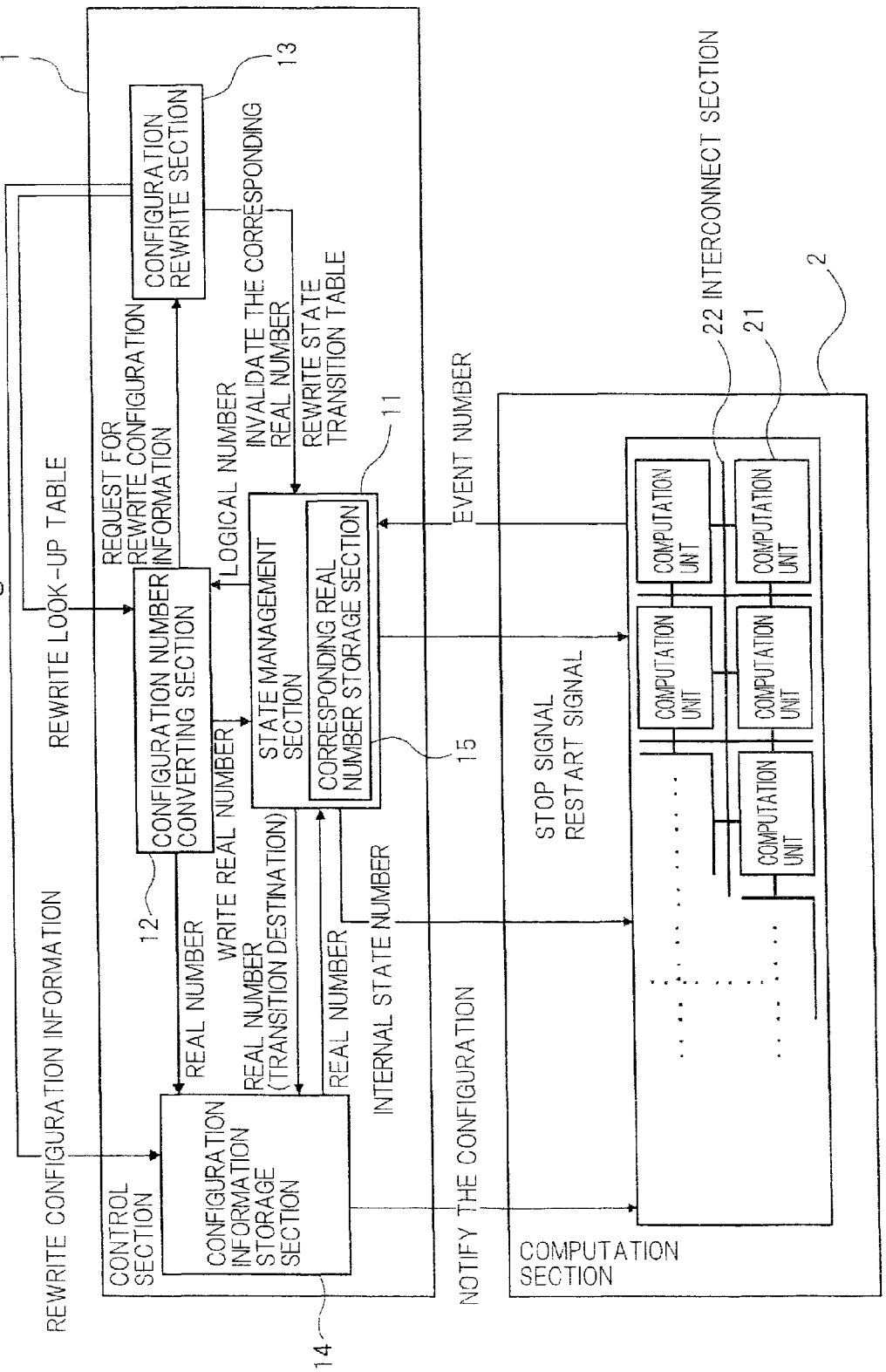
FIG. 6 is a block diagram showing the structure of a data processing device according to a sixth exemplary embodiment.

FIG. 6 is a block diagram showing the structure of a data processing device according to a sixth exemplary embodiment.

The data processing device according to the sixth exemplary embodiment is different from the data processing device according to the fourth exemplary embodiment in that the configuration rewrite section 13 invalidates an entry of the corresponding real number storage section 15 and writes a real number into the storage location.

After the configuration rewrite section 13 rewrites specified configuration information corresponding to a rewrite request issued from the configuration number converting section 12, the configuration rewrite section 13 invalidates an entry with a real number to be rewritten to the corresponding real number storage section 15, and rewrites both a transition destination candidate group stored in the state management section 11 and converting information that the configuration number converting section 12 needs to perform the converting process that converts a logical number into a real number. Thereafter, the computation section 2 resumes the operation. When the real number corresponding to the logical number of the transition destination of the rewritten configuration information is valid, the configuration rewrite section 13 writes the real number into a predetermined storage location of the corresponding real number storage section 15 and stores information that denotes that the real number is valid in the storage location.

In addition, the configuration rewrite section 13 writes a real number to a predetermined location (entry) that represents the transition destination of the rewritten configuration information of the corresponding real number storage section 15 and stores information that denotes that the real number is valid in the storage location. Except for the foregoing description, since the structure and operation of each of the control section 1 and the computation section 2 are the same as those of the data processing device according to the fourth exemplary embodiment, their description will be omitted.

In the data processing device according to this exemplary embodiment, since the configuration rewrite section 13 invalidates an entry of the corresponding real number storage section 15 and writes a real number into the storage location, even in the initial transition after configuration information of both a transition source and a transition destination is written, while the computation section 2 is operating, a logical number of configuration information used in the next operation state is converted to a real number and it becomes valid. As a result, the required operation time of the data processing device according to this exemplary embodiment can be decreased as compared to the fourth exemplary embodiment.

When the configuration information storage section 14 is permitted to be rewritten while the computation section 2 is operating, since configuration information of the transition destination can be successfully written to the configuration information storage section 14, while the computation section 2 is operating for a long time, the required operation time can be decreased as compared to the background art data processing device in which configuration information stored in the configuration information storage section 14 is rewritten on demand.

EXAMPLES

Next, with reference to the accompanying drawings, data processing device according to examples of the present invention will be described.

First Example

A data processing device according to a first example is an example in which the foregoing first exemplary embodiment is applied to the data processing device according to the foregoing Prior Art Invention 1 (Japanese Patent Application No. 2006-103987).

Figure 7:
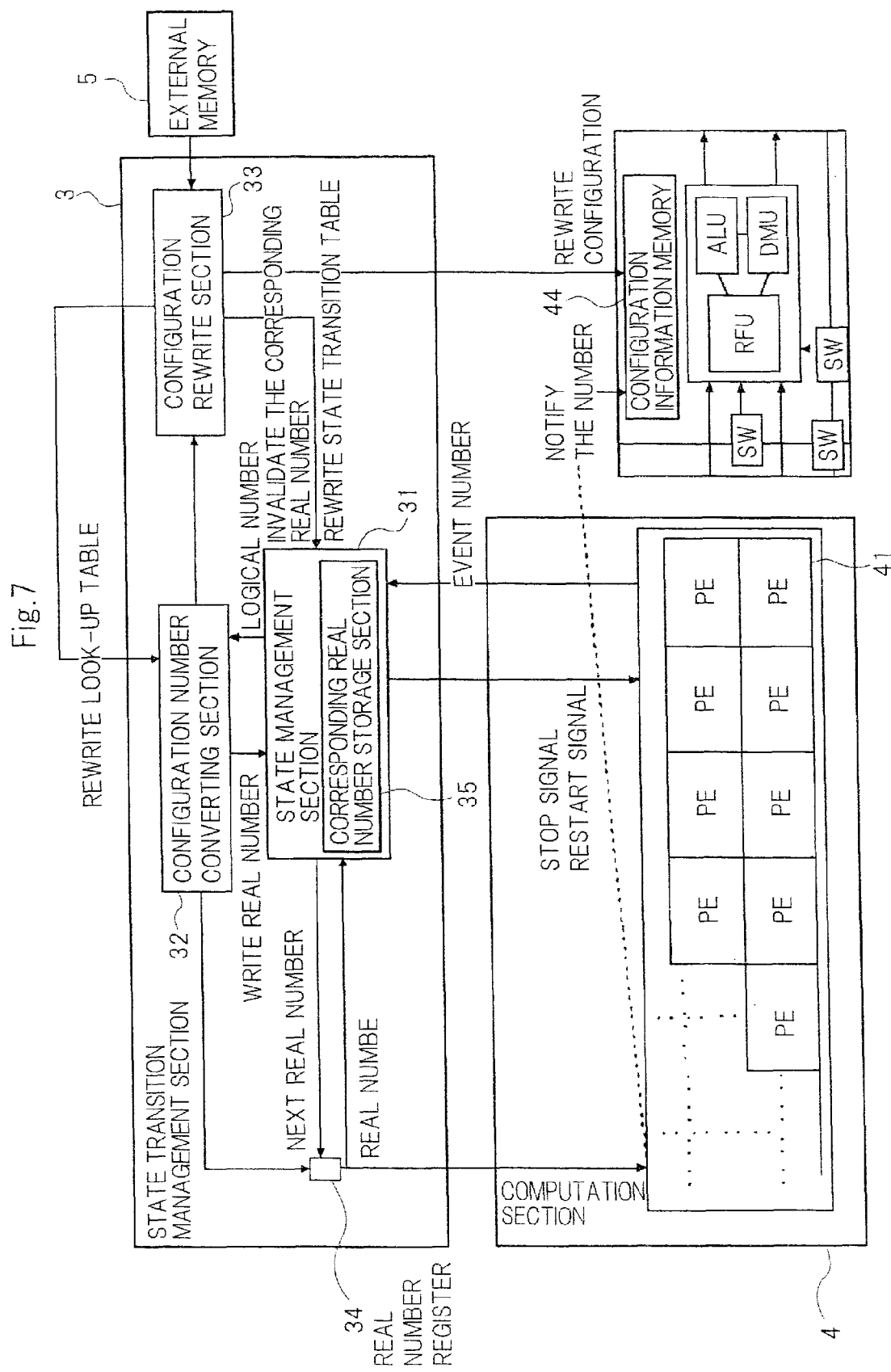
FIG. 7 is a block diagram showing the structure of a data processing device according to a first example.

FIG. 7 is a block diagram showing the structure of the data processing device according to the first example.

In this example, only a state transition management section (STC) 3 of the data processing device presented in the foregoing Prior Art Invention 1 is changed, but a computation section 4 is not changed at all.

The computation section 4 according to this example has a structure in which a plurality of processor elements 41 (PEs) each of which is provided with a register file (RFU), an ALU, and a data process and computation unit (DMU) and the individual processor elements 41 are interconnected by wires and switches (SWs). In such a structure, each processor element 41 that is provided with RFU, FFU, ALU, DMU, and so forth corresponds to the computation unit 21 according to the first exemplary embodiment. Note that the computation section 4 may be composed of, for example, a logic array instead of the processor elements 41.

The processor element 41 according to this example is provided with a configuration information memory 44. When a real number is specified, the processor element 41 reads the contents (configuration information) corresponding to the specified real number from the configuration information memory 44 and causes RFU, FFU, ALU, DMU, and so forth to operate and the switches to connect them corresponding to the real number.

The state transition management section according to this example corresponds to the state transition management section (STC) 3 of the DRP that is provided with a state management section 31, a configuration number converting section 32, a configuration rewrite section 33, and a real number register 34.

According to this example, the state management section 31 is provided with a corresponding real number storage section 35.

When the state management section 31 receives the current real number stored in the real number register 34 and an event signal sent from the computation section 4, the state management section 31 decides a logical number of the next transition destination based on the real number and the event signal. If the corresponding real number storage section 35 has not stored the real number of the next transition destination, the state management section 31 reads information that represents invalid value from the corresponding real number storage section 35.

Hereinafter, a storage location (entry) of the corresponding real number storage section 35 identified by the current real number and an event signal is referred to as "corresponding storage location."

When a real number of the next transition destination has been read from a corresponding storage location of the corresponding real number storage section 35, the state management section 31 writes the real number into the real number register 34.

If the state management section 31 has read information that represents invalid value from a corresponding storage location of the corresponding real number storage section 35, since a real number corresponding to a logical number of the next transition destination is unknown, the state management section 31 requests the configuration number converting section 32 to convert the logical number of the next transition destination into a real number.

When the configuration number converting section 32 has succeeded in converting the logical number into a real number, the state management section 31 writes the real number received from the configuration number converting section 32 into the real number register 34. At the same time, the state management section 31 writes the real number of the next transition destination into the corresponding storage location of the corresponding real number storage section 35.

In contrast, if the configuration number converting section 32 has failed to convert the logical number into a real number, configuration information with the logical number of the next transition destination will not have been stored in the configuration information memory 44. In this case, since configuration information stored in the configuration information memory 44 needs to be rewritten, the configuration number converting section 32 notifies the configuration rewrite section 33 of the logical number of the next transition destination and requests the configuration rewrite section 33 to rewrite configuration information stored in the configuration information memory 44.

The configuration rewrite section 33 decides the real number of unnecessary pieces of configuration information at the current time from configuration information stored in the configuration information memory 44 and invalidates the entry of the corresponding real number storage section 35 that stores the decided real number. Unnecessary configuration information can be selected using a known method such as the LRU (Least Recently Used) method or the like. Thereafter, the configuration rewrite section 33 writes configuration information that has been requested to be rewritten to the invalidated entry of the configuration information memory 44. Configuration information to be written to the configuration information memory 44 is obtained from an external memory 5. Moreover, the configuration rewrite section 33 updates the transition destination candidate group of the current real number stored in the state management section 31 and converting information that the configuration number converting section 32 needs to perform the converting process that converts the logical number into a real number and writes the real number into the real number register 34.

After the configuration rewrite section 33 rewrites configuration information stored in the configuration information memory 44, the configuration number converting section 32 writes the real number of the transition destination in a corresponding storage location of the corresponding real number storage section 35.

When the configuration number converting section 32 performs the converting process that converts a logical number into a real number and the configuration rewrite section 33 rewrites configuration information, the state management section 31 issues a WE cancellation to the group of processor elements 41 to prohibit data from being written to registers and to stop the operation of the group of processor elements 41.

In this example, the configuration information memory 44 of each of the processor elements 41 corresponds to the configuration information storage section 14.

In addition, according to this example, the state management section 31 holds logical numbers of next transition destinations and real numbers or information that represents invalid stored in the corresponding real number storage section 35 based on real numbers and event signals in a tabular format shown in FIG. 8.

Hereinafter, real numbers and logical numbers are represented with quotation marks such as "0" so as to prevent them from being confused with reference numerals of structural components of the device.

FIG. 8 shows an example in which if real number "0" and event signal A are specified, next logical number "1" and next real number "1" will be read; if real number "1" and event signal A are specified, next logical number "0" and next real number "0" will be read; and if real number "1" and event signal B are specified, since next logical number "2" and next real number have not been stored in the corresponding real number storage section 35, information that represents invalid will be read.

"Next logical number" entries corresponding to individual real numbers shown in FIG. 8 are represented by "-" that denotes that an event signal does not occur. Thus, "corresponding real number storage section 35" entries corresponding to these real numbers are kept blank. In FIG. 8, "next logical number" entries corresponding to real numbers "2" to "7" and corresponding to all event signals are represented by "-," while "corresponding real number storage section 35" entries corresponding thereto are all blank.

In this example, the configuration number converting section 32 holds the relationship between real numbers and logical numbers in a tabular format (look-up table) shown in FIG. 9. In other words, the configuration number converting section 32 according to this example uses the content addressable memory scheme in which, when a logical number is specified, the configuration number converting section 32 searches the look-up table shown in FIG. 9 for the logical number and outputs a real number corresponding to the detected logical number. FIG. 9 shows that configuration information with logical number "0" has been stored corresponding to real number "0" and that configuration information with logical number "1" has been stored corresponding to real number "1."

Moreover, in this example, the external memory (storage means) 5 that has stored an object code is provided such that various pieces of configuration information of the object code can be obtained from the external memory 5.

Figure 10:
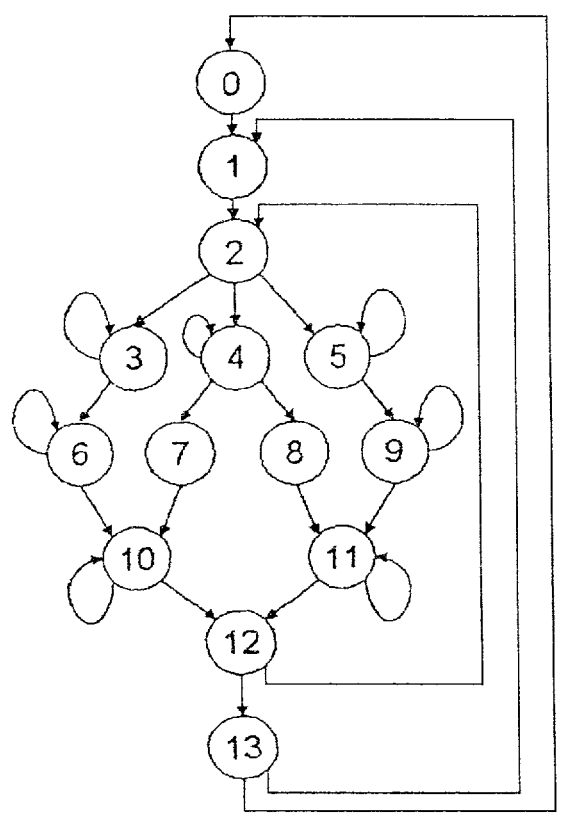
FIG. 10 shows an example of a state transition chart of an object code that the data processing device according to the first example uses.

Next, with an example of the case in which a process is executed corresponding to the state transition chart shown in FIG. 10, the operation of the data processing device according to this example will be described. FIG. 10 shows the state transition chart of an object code composed of a total of 14 pieces of configuration information in which encircled numerals represent logical numbers.

In this example, it is assumed that configuration information with logical number "1" has been stored at the storage location with real number "0" of a configuration information memory with which the data processing device (DRP) is provided. FIG. 11A shows a look-up table with which the state management section 31 is provided at this point.

On the look-up table shown in FIG. 11A, configuration information with logical number "0" has been written to real number "0" and configuration information with logical number "1" has been written to real number "1." The corresponding real number storage section 35 has not stored the real numbers of transition destinations. In addition, it is assumed that the maximum real number is "7" and the look-up table can hold a total of eight pieces of configuration information.

Next, the operation of the data processing device that is executing a process for logical number "0" in the first cycle will be considered.

In this case, real number "0" has been written to the real number register 34. Thus, the configuration information memory 44 of each processor element 41 is notified of real number "0," then corresponding configuration information is read therefrom, and thereby the relationship between the operations of the individual processor elements 41 and connections of switches is decided. As a result, each processor element 41 executes a predetermined computation.

When the state management section 31 is notified of the computational result of each processor element 41 as event signal A, the state management section 31 decides logical number "1" of the next state corresponding to the current real number "0" and event signal A based on the look-up table generated corresponding to the state transition chart. At the same time, the state management section 31 reads "invalid" value from the corresponding storage location of the corresponding real number storage section 35.

In this case, since "invalid" value is read from the corresponding storage location of the corresponding real number storage section 35, the state management section 31 continuously issues the WE cancellation signal that causes the group of processor elements 41 to stop their operations in the second and later cycles. This signal causes registers of the processor elements 41 not to be updated. In addition, this signal causes data not to be input from the external port.

In the second cycle, the state management section 31 notifies the configuration number converting section 32 of logical number "1" of the next state.

The configuration number converting section 32 converts logical number "1" into a real number based on the look-up table. In this case, since configuration information with logical number "1" has been stored in the configuration information memory 44, the configuration number converting section 32 succeeds in converting the logical number into the real number. The state management section 31 stores real number "1" obtained from the configuration number converting section 32 to the real number register 34. Moreover, the state management section 31 stops issuing the WE cancellation signal and causes the group of processor elements 41 to resume the operation from the next cycle.

Furthermore, the state management section 31 writes real number "1" of the transition destination to the corresponding storage location of the corresponding real number storage section 35 and also writes information that represents a valid value to the storage location. FIG. 11B shows a look-up table with which the state management section 31 is provided at this point.

In the third cycle, the real number register 34 notifies the configuration information memory 44 of real number "1," then corresponding configuration information is read therefrom, and thereby the relationship between the operations of the individual processor elements 41 and the connections of switches is decided. As a result, the individual processor elements 41 execute their predetermined operation.

When the state management section 31 is notified of the computational result of each processor element 41 as event signal A, the state management section 31 decides logical number "2" of the next state corresponding to the current real number "1" and event signal A based on the look-up table generated corresponding to the state transition chart. At the same time, the state management section 31 reads "invalid" value from the corresponding storage location of the corresponding real number storage section 35.

In this case, since "invalid" value is read from the corresponding storage location of the corresponding real number storage section 35, the state management section 31 continuously issues the WE cancellation signal that causes the group of processor elements 41 to stop their operations in the second and later cycles. This signal causes registers of the processor elements 41 not to be updated. In addition, this signal causes data not to be input from the external port.

In the fourth cycle, the state management section 31 notifies the configuration number converting section 32 of logical number "2" of the next state.

The configuration number converting section 32 tries to convert logical number "2" into a real number based on the look-up table. In this case, since configuration information with logical number "2" has not been stored in the configuration information memory 44, the configuration number converting section 32 fails to convert the logical number into a real number. If the configuration number converting section 32 fails to convert the logical number into a real number, the configuration number converting section 32 requests the configuration rewrite section 33 to write configuration information with logical number "2" to the configuration information memory 44.

The configuration rewrite section 33 rewrites the content of the configuration information memory 44, the state management section 31, and the configuration number converting section 32. In this case, the configuration rewrite section 33 uses real number "2" that has not been used.

The configuration rewrite section 33 obtains configuration information with logical number "2" from the external memory 5 and writes the configuration information to the configuration information memory 44. In addition, the configuration rewrite section 33 writes information about logical number "2" of the transition destination into the entry with real number "2" of the state management section 31, and writes logical number "2" into the entry with real number "2" of the configuration number converting section 32.

After the configuration rewrite section 33 has completed the rewrite operation, the configuration number converting section 32 sends real number "2" corresponding to logical number "2" to the real number register 34. Moreover, the state management section 31 stops issuing the WE cancellation signal and causes the group of processor elements 41 to resume the operation from the next cycle.

FIG. 11C shows a look-up table with which the state management section 31 is provided when transitions occur in the order of logical numbers "3"→"3"→"3"→"6"→"6"→"10"→"10"→"12" and then logical number "12" returns to logical number "2."

If a transition occurs from logical number "2" to logical number "3" again, the state management section 31 can read not only logical number "3" of the transition destination corresponding to the current real number "2" and event signal A, but also real number "3" of the transition destination from the corresponding real number storage section 35.

Thus, the state management section 31 reads valid real number "3" from the corresponding storage location of the corresponding real number storage section 35 and stores real number "3 in the real number register 34. In the next cycle, the real number register 34 notifies the configuration information memory 44 of real number "3," then the corresponding configuration information is read from the configuration information memory 44, and thereby the relationship between the operations of the individual processor elements 41 and the connections of switches is decided. As a result, the individual processor elements 41 execute their operation.

In this cycle, without stopping the operation of the computation section 4, the individual processor elements 41 can execute a computation corresponding to logical number "3" in the next cycle after event signal A is issued. In addition, since the corresponding real number storage section 35 has already stored real numbers corresponding to up to logical number "12," the computation section 4 can operate without any need to use the configuration number converting section 32.

FIG. 11D shows a look-up table with which the state management section 31 is provided when a loop of state transitions of logical numbers "2"→"3"→"6"→"10"→"12"→"2" is repeated several times and then state transitions of logical numbers "12"→"13"→"0"→"1"→"2" occur.

In this situation, the case in which the computation section 4 generates event signal B will be considered.

The state management section 31 reads "invalid" value from the corresponding real number storage section 35 corresponding to the current real number "2" and event signal B. In this case, since the configuration number converting section 32 fails to convert logical number "4" into a real number in the next cycle, the configuration number converting section 32 requests the configuration rewrite section 33 to write configuration information with logical number "4" to the configuration information memory 44.

The configuration rewrite section 33 rewrites the contents of the configuration information memory 44, the state management section 31, and the configuration number converting section 32. In this case, since there is no unused real number, it is necessary to decide a location to which configuration information with logical number "4" will be written. Thus, logical number "0" is deleted based on frequency of use.

If logical number "0" is deleted corresponding to real number "0" of the configuration information memory 44, an entry with a transition to real number "0" of the corresponding real number storage section 35 will be invalidated. In this case, an entry identified by real number "7" and event signal A becomes a candidate. After a particular entry of the corresponding real number storage section 35 is invalidated, configuration information corresponding to real number "0" are deleted from the configuration information memory 44, the state management section 31, and the configuration number converting section 32 and the contents with logical number "4" are written to the storage location. FIG. 11E shows a look-up table with which the state management section 31 is provided after the contents are written.

Figure 12:
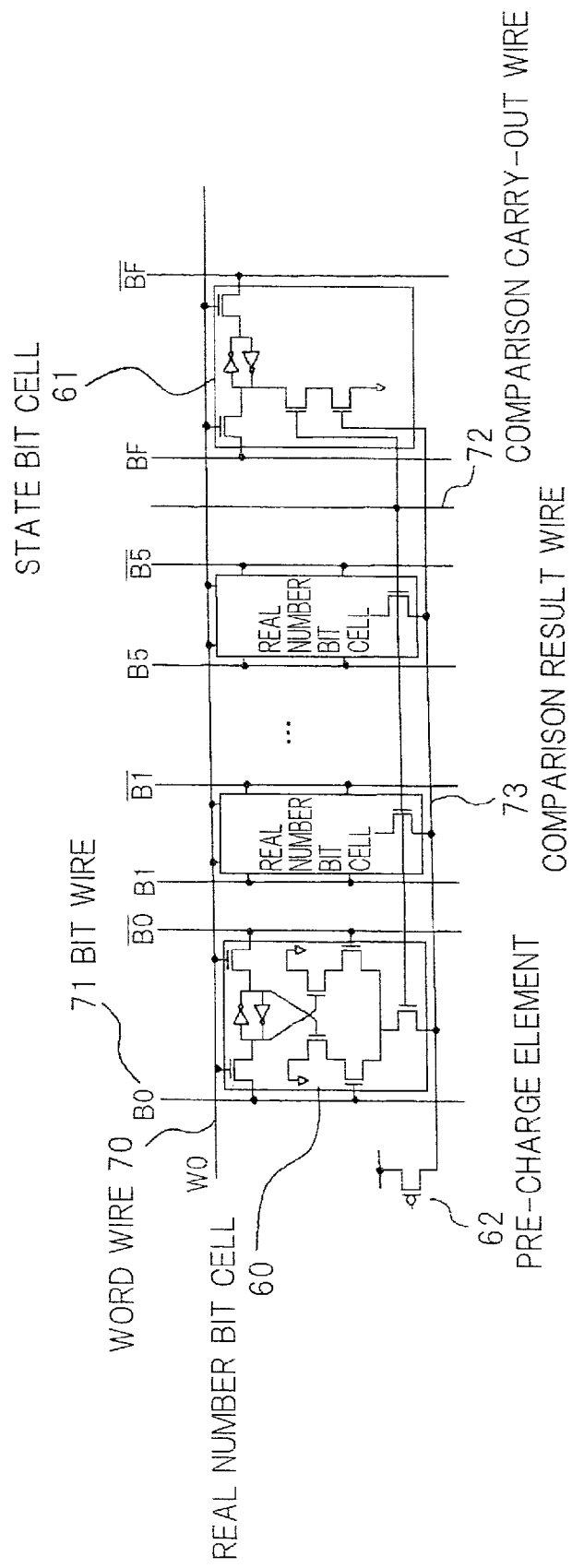
FIG. 12 is a circuit diagram showing an example of the structure of a corresponding real number storage section with which the data processing device shown in FIG. 7 is provided.

FIG. 12 shows an example of circuitry that invalidates an entry with a transition to a particular real number of the corresponding real number storage section 35.

FIG. 12 shows an example of circuitry of one entry of the corresponding real number storage section 35 that has a plurality of real number bit cells 60 that hold a real number as bits and the state bit cells 61 that hold information that denotes whether or not the real number is valid. FIG. 12 also shows an example of circuitry in which real numbers are composed of 6 bits each and bit values are supplied to the individual real number bit cells 60 through two bit wires 71 (barred signals are used for inverted signals).

The real number bit cells 60 each are provided with a storage element composed of two invertors depicted at the upper portion of the drawing, a write element controlled through a word wire 70, and a comparison circuit depicted at the lower portion of the drawing.

Connected to the real number bit cells 60 are the word wire 70, the bit wire 71, a comparison carry-out wire 72, and a comparison result wire 73. Connected to the state bit cells 61 are the bit wires 71, the comparison carry-out wire 72, and the comparison result wire 73. In addition, connected to the comparison result wire 73 is a pre-charge element 62.

The state bit cells 61 each are provided with a storage element composed of two inverters depicted at the upper portion of the drawing, a write element controlled through the word wire 70, and an invalidation write circuit depicted at the lower portion of the drawing.

The real number bit cells 60 and the state bit cells 61 are connected to a read circuit (not shown) through the bit wires 71.

Actually, the corresponding real number storage section 35 has a structure in which a plurality of circuits shown in FIG. 12 are arranged in parallel in the vertical direction of the drawing and the entire circuits share the bit wires 71 and the comparison carry-out wires 72. FIG. 12 omits the structure of the read circuit that reads bit values stored in the real number bit cells 60.

Next, the operation of the corresponding real number storage section 35 shown in FIG. 12 will be described.

The pre-charge element 62 causes the potential of the comparison result wire 73 to be High in advance.

When a real number is invalidated, it is supplied to the individual real number bit cells 60 through the bit wires 71. In addition, a bit pattern signal that represents an invalidation state is supplied to the state bit cells 61 through the bit wires 71.

The real number bit cells 60 compare bit values supplied through the bit wires 71 with values that have been held using the comparison circuit. Assuming that the potential of the comparison carry-out wire 72 is High, if no bit of the compared result match, the ground potential and the comparison result wire 73 are connected and thereby the potential of the comparison result wire 73 becomes Low. In contrast, if all bits of the comparison result match, the potential of the comparison result wire 73 is kept High. The state bit cells 61 write "invalid" into the storage element using the invalidation write circuit if the potential of the comparison result wire 73 is Low.

Likewise, for state transitions that have occurred, since the state management section 31 reads the next real number stored in the corresponding real number storage section 35 and writes it into the real number register 34, a computation corresponding to the next logical number is executed in the next cycle without any need to use the configuration number converting section 32.

In this example, as compared to the foregoing Prior Art Invention 1 in which the contents of the state management section 31 are read and in which a result that is read from the configuration number converting section corresponding to the contents that have been read is written to the real number register 34, the lag that occurs before the computation is executed can be decreased. In this example, since the read process for the configuration number converting section 32 is executed in another cycle, the number of cycles necessary for the operation is decreased, and thereby performance of the data processing device is improved.

Second Example

A data processing device according to a second example is an example in which the foregoing fifth exemplary embodiment is applied to the data processing device according to the foregoing Prior Art Invention 1 (Japanese Patent Application No. 2006-103987).

Figure 13:
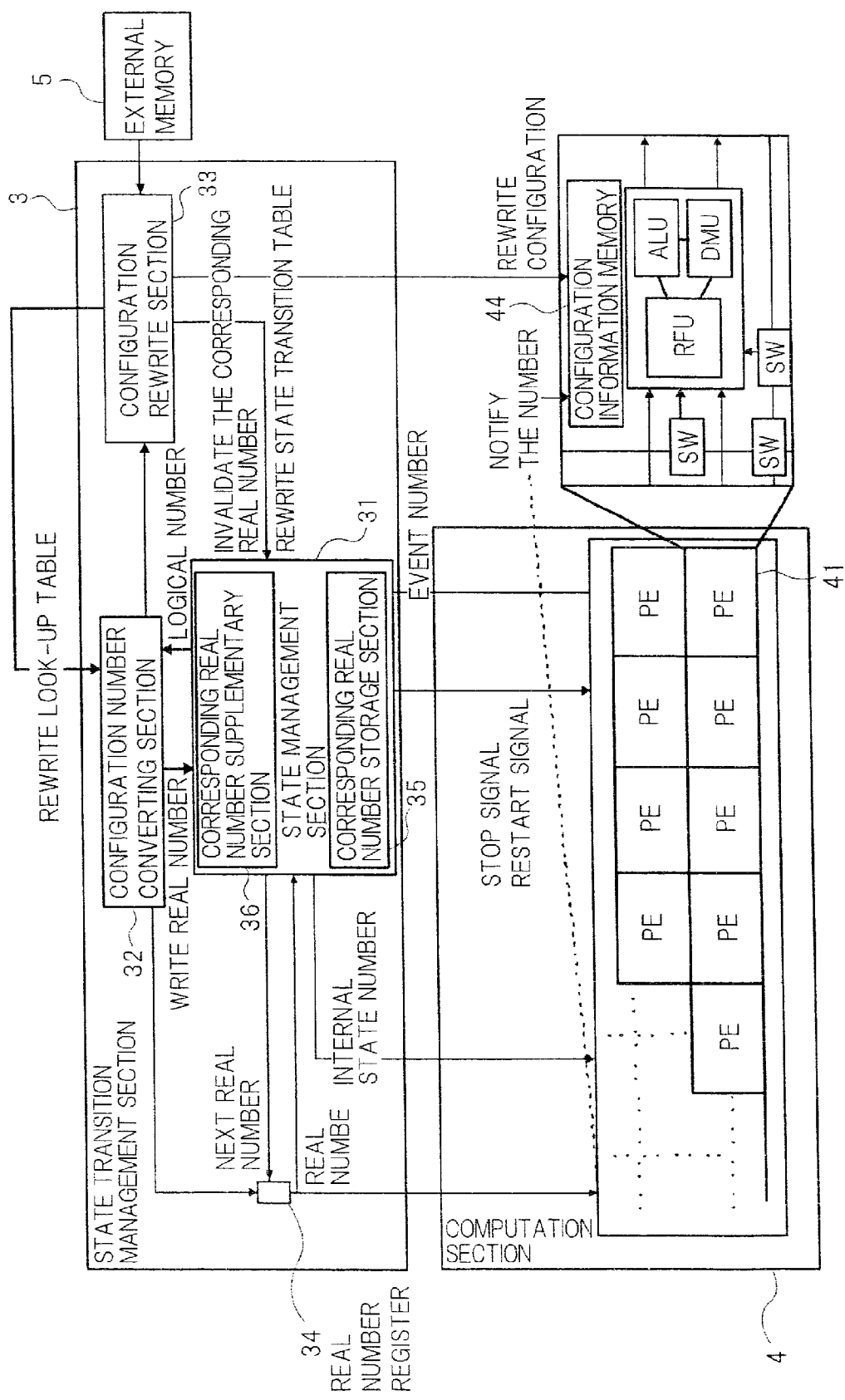
FIG. 13 is a block diagram showing the structure of a data processing device according to a second example.

FIG. 13 is a block diagram showing the structure of the data processing device according to the second example.

In this example, only the state transition management section (STC) 3 of the data processing device presented in the foregoing Prior Art Invention 1 is changed, but the computation section 4 is not changed at all.

The computation section 4 according to this example has a structure in which a plurality of processor elements 41 (PEs) each of which is provided with a register file (RFU), an ALU, and a data process and computation unit (DMU) and the individual processor elements are interconnected by wires and switches (SWs). In such a structure, each processor element 41 that is provided with RFU, FFU, ALU, DMU, and so forth corresponds to the computation unit 21 according to the first exemplary embodiment. Note that the computation section 4 may be composed of, for example, a logic array instead of the processor elements 41.

The processor element 41 according to this example is provided with the configuration information memory 44. When a real number is specified, the processor element 41 reads the contents (configuration information) corresponding to the specified real number from the configuration information memory 44 and causes RFU, FFU, ALU, DMU, and so forth to operate and the switches to connect them corresponding to the configuration information.

The state transition management section according to this example corresponds to the state transition management section (STC) 3 of the DRP that is provided with the state management section 31, the configuration number converting section 32, the configuration rewrite section 33, and the real number register 34.

The state management section 31 according to this example is provided with the corresponding real number storage section 35 and the corresponding real number supplementary section 36.

When the state management section 31 receives the current real number stored in the real number register 34 and an event signal sent from the computation section 4, the state management section 31 decides a logical number of the next transition destination based on the real number and the event signal. If the corresponding real number storage section 35 has not stored the real number of the next transition destination, the state management section 31 reads information that represents invalid from the corresponding real number storage section 35.

Hereinafter, a storage location (entry) of the corresponding real number storage section 35 identified by the current real number and an event signal is referred to as "corresponding storage location."

When a real number of the next transition destination has been read from a corresponding storage location of the corresponding real number storage section 35, the state management section 31 writes the real number to the real number register 34.

If the state management section 31 has read information that represents invalid value from the corresponding storage location of the corresponding real number storage section 35, since the real number corresponding to a logical number of the next transition destination is unknown, the state management section 31 requests the configuration number converting section 32 to convert the logical number of the next transition destination into a real number.

When the configuration number converting section 32 has succeeded in converting the logical number into a real number, the state management section 31 writes the real number received from the configuration number converting section 32 into the real number register 34. At the same time, the state management section 31 writes the real number of the next transition destination into the corresponding storage location of the corresponding real number storage section 35.

In contrast, if the configuration number converting section 32 has failed to convert the logical number into a real number, configuration information with the logical number of the next transition destination will not have been stored in the configuration information memory 44. In this case, since configuration information stored in the configuration information memory 44 needs to be rewritten, the configuration number converting section 32 notifies the configuration rewrite section 33 of the logical number of the next transition destination and requests the configuration rewrite section 33 to rewrite configuration information stored in the configuration information memory 44.

The configuration rewrite section 33 decides a real number of unnecessary pieces of configuration information at the current time from configuration information stored in the configuration information memory 44 and invalidates the entry of the corresponding real number storage section 35 that stores the decided real number. Unnecessary pieces of configuration information can be selected using a known method such as the LRU (Least Recently Used) method or the like. Thereafter, the configuration rewrite section 33 writes configuration information that has been requested to be rewritten to the invalidated entry of the configuration information memory 44. Configuration information to be written to the configuration information memory 44 is obtained from the external memory 5. Moreover, the configuration rewrite section 33 updates the transition destination candidate group of the current real number stored in the state management section 31 and converting information that configuration number converting section 32 needs to perform the converting process that converts the logical number into a real number and writes the real number into the real number register 34.

After the configuration rewrite section 33 rewrites configuration information stored in the configuration information memory 44, the configuration number converting section 32 writes the real number of the transition destination into a corresponding storage location of the corresponding real number storage section 35.

When the configuration number converting section 32 performs the converting process that converts a logical number into a real number and the configuration rewrite section 33 rewrites configuration information, the state management section 31 issues a WE cancellation to the group of processor elements 41 to prohibit data from being written to registers and to stop the operation of the group of processor elements 41.

The corresponding real number supplementary section 36 selects one of the event signals that has been invalidated in the corresponding real number storage section 35 from transition destinations of the current real number and notifies the configuration number converting section 32 of a logical number corresponding to the selected event signal in preference to others. When the same event signal as the event signal that has been selected is notified by the computation section 4 and the configuration number converting section 32 succeeds in converting the logical number into a real number, the real number obtained from the configuration number converting section 32 is written into a corresponding entry of the corresponding real number storage section 35 and also is written into the real number register 34.

In this case, the configuration information memory 44 is notified of the real number stored in the real number register 34 in the next cycle and the corresponding configuration information is read from the configuration information memory 44 and thereby the relationship between the operations of the individual processor elements 41 and the connections of switches is decided. Thereafter, the group of processor elements 41 is notified of an internal state number and the individual processor elements 41 execute their predetermined computation.

In this example, the configuration information memory 44 of each of the processor elements 41 corresponds to the configuration information storage section 14.

In addition, according to this example, it is assumed that the state management section 31 holds logical numbers of next transition destinations and real numbers or information that represents invalid value stored in the corresponding real number storage section 35 based on real numbers and event signals in a tabular format shown in FIG. 14.

Hereinafter, real numbers and logical numbers are represented with quotation marks such as "0" so as to prevent them from being confused with reference numerals of structural components of the device. In addition, logical number— internal state number sets are represented with quotation marks such as "1-1." If represented as "1-1," it represents a logical number—internal state number set.

FIG. 14 shows an example in which if real number "1" and event signal A are specified, next logical number—internal state number "1-1" and next real number "1" will be read; if real number "1" and event signal A are specified, next logical number—internal state number set "0-1" and next real number "0" will be read; and if real number "1" and event signal B are specified, next logical number—internal state number set "2-1" and information that represents "invalid" value will be read.

"Next logical number" entries corresponding to individual real numbers shown in FIG. 14 are represented by "-" that denotes that an event signal does not occur. Thus, "corresponding real number storage section 35" entries corresponding to these real numbers are kept blank. In FIG. 14, "next logical number" entries corresponding to real numbers "2" to "7" and corresponding to all event signals are represented by "-," while "corresponding real number storage section 35" entries corresponding thereto are all blank.

In this example, like the first example, the configuration number converting section 32 holds the relationship between real numbers and logical numbers in a tabular format (look-up table) shown in FIG. 9. In other words, the configuration number converting section 32 according to this example uses the content addressable memory scheme in which when a logical number is specified, the configuration number converting section 32 searches the look-up table shown in FIG. 9 for the logical number and outputs a real number corresponding to the detected logical number. FIG. 9 shows that configuration information with logical number "0" has been stored corresponding to real number "0" and that configuration information with logical number "1" has been stored corresponding to real number "1."

Moreover, in this example, the external memory (storage means) 5 that has stored an object code is provided such that various pieces of configuration information of the object code can be obtained from an external memory 6.

Figure 15:
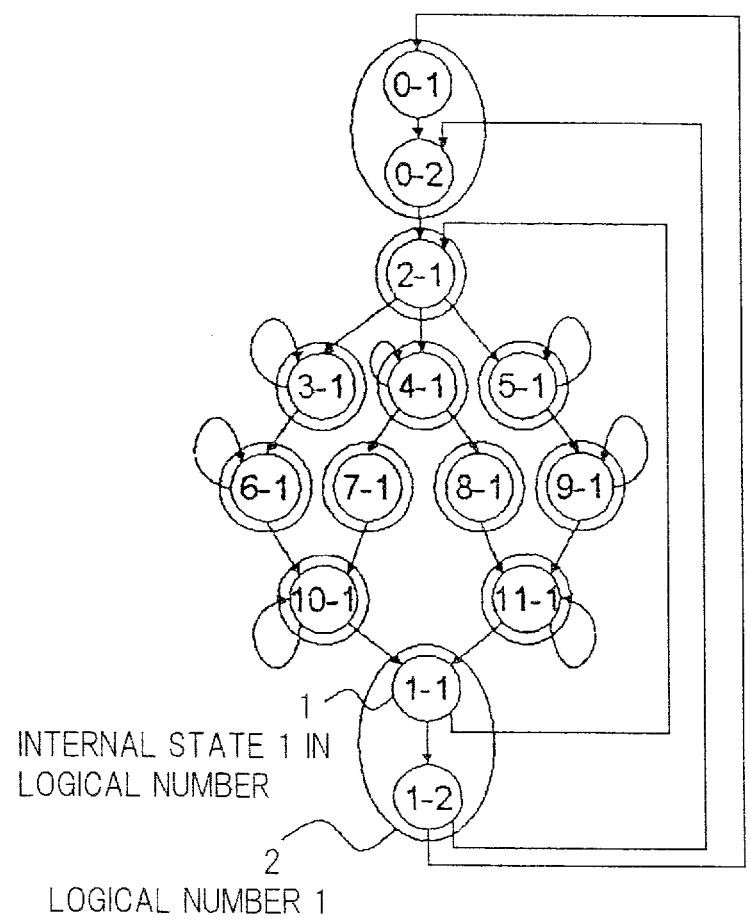
FIG. 15 shows an example of a state transition chart of an object code that the data processing device according to the second example uses.

Next, with an example of the case in which a process is executed according to a state transition chart shown in FIG. 15, the operation of the data processing device corresponding to this example will be described. FIG. 15 shows that small encircled numerals represent logical number—internal state number sets and that large encircled numerals represent logical numbers. Logical numbers "0" and "1" each have two internal states, whereas logical numbers "2" to "11" each have one internal state. FIG. 15 shows a state transition chart of an object code composed of a total of 12 pieces of configuration information. Although the states and state transitions shown in FIG. 15 are the same as those of the state transition chart (FIG. 10) presented in the first example, the former is different from the latter in their number allocating method because the former has internal states.

In this example, it is assumed that configuration information with logical number "1" has been stored at the storage location with real number "0" of a configuration information memory with which the data processing device (DRP) is provided. FIG. 16A shows a look-up table with which the state management section 31 is provided at this point.

On the look-up table shown in FIG. 16A, configuration information with logical number "0" has been written to real number "0." The corresponding real number storage section 35 has not stored real numbers of transition destinations. In addition, it is assumed that the maximum real number is "7" and the look-up table can hold a total of eight pieces of configuration information.

Next, the operation of the data processing device that is executing a process for logical number—internal state number "0-1" in the first cycle will be considered.

In this case, real number "0" has been written to the real number register 34. In addition, the state management section 31 outputs internal state number "1." Thus, the configuration information memory 44 of each processor element 41 is notified of real number "0," then corresponding configuration information is read therefrom, and thereby the relationship between the operations of the individual processor elements 41 and connections of switches is decided. In addition, each processor element 41 is notified of internal state number "1" and the operations of part of computation units are decided. As a result, each processor element 41 executes a predetermined computation.

At the same time, the corresponding real number supplementary section 36 selects one of the event signals that are "invalid" of the corresponding real number storage section 35. In this case, it is assumed that the corresponding real number supplementary section 36 has selected event signal A. The corresponding real number supplementary section 36 notifies the configuration number converting section 32 of logical number "0" corresponding to event signal A that has been selected in preference to others. The configuration number converting section 32 converts logical number "0" into real number "0" based on the look-up table and notifies the real number register 34 and the state management section 31 of real number "0."

When the state management section 31 is notified of the computational result of the processor element 41 as event signal A, since this event signal A matches the event signal A that the corresponding real number supplementary section 36 has selected and the configuration number converting section 32 has succeeded in converting a logical number into a real number, the real number register 34 holds real number "0" notified by the configuration number converting section 32. On the other hand, the state management section 31 stores real number "0" of the transition destination in the corresponding storage location of the corresponding real number storage section 35 and also stores information that represents "valid" in the storage location. In addition, the state management section 31 reads internal state number "2" of the next cycle.

Figure 16B:
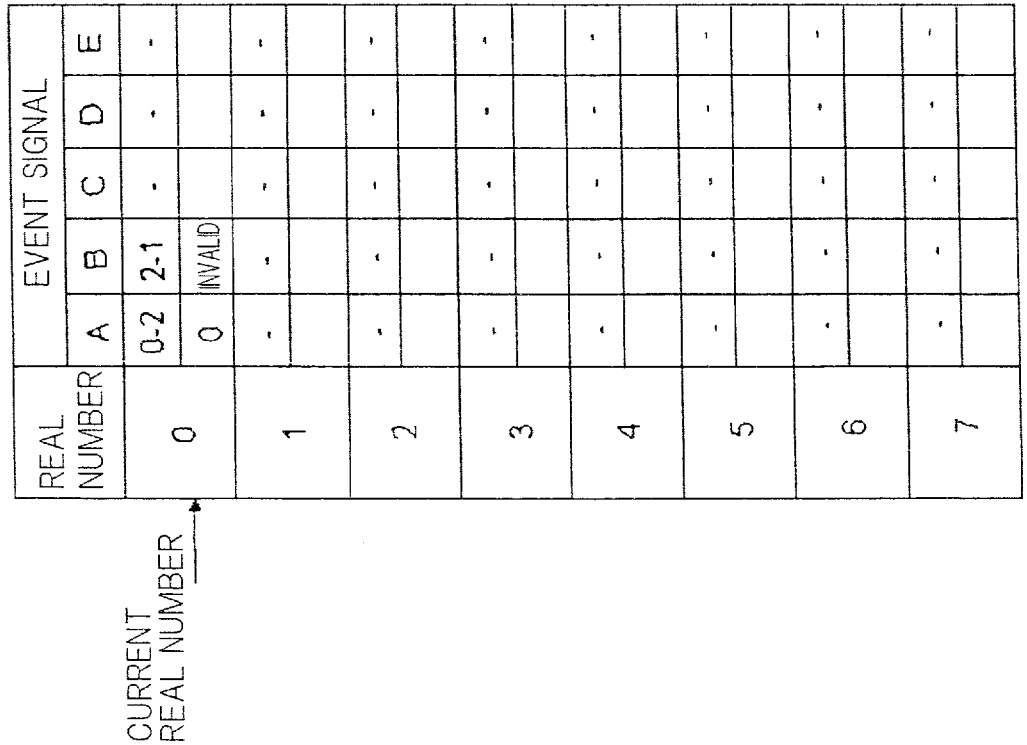
FIG. 16B is a schematic diagram showing an example of a look-up table with which the state transition management section is provided and a look-up table that the configuration number converting section uses when an operation is performed corresponding to the state transition chart shown in FIG. 15.

In the second cycle, computation section 4 executes a process for logical number—internal state number "0-2." FIG. 16B shows a look-up table with which the state management section 31 is provided at this point.

In the second cycle, real number "0" is written to the real number register 34 and the state management section 31 outputs internal state number "2." The configuration information memory 44 is notified of real number "0" stored in the real number register 34, then the corresponding configuration information is read, and thereby the relationship between the operations of the individual processor elements 41 and the connections of switches is decided. In addition, the individual processor elements 41 are notified of internal state number "2" and the operation of part of computation units is decided. As a result, each processor element 41 executes a predetermined computation. In this case, although configuration information in the second cycle is the same as that in the first cycle, since their internal state numbers are different, the computational result in the second cycle differs from that in the first cycle.

The corresponding real number supplementary section 36 selects one of event signals that are "invalid" from the corresponding real number storage section 35. In this case, it is assumed that the corresponding real number supplementary section 36 has selected event signal B.

The corresponding real number supplementary section 36 notifies the configuration number converting section 32 of logical number "2" corresponding to event signal B that has been selected in preference to others. The configuration number converting section 32 tries to convert logical number "2" into a real number; however, it fails.

When the state management section 31 is notified of the computational result of each processor element 41 as event signal B, since this event signal B matches the event signal B that the corresponding real number supplementary section 36 has selected and since the configuration number converting section 32 has failed to convert a logical number into a real number, the configuration number converting section 32 requests the configuration rewrite section 33 to write configuration information with logical number "2" into the configuration information memory 44. In addition, the state management section 31 continuously issues the WE cancellation signal so as to stop the operations of the group of processor elements 41 in the third and later cycles. This signal causes registers of the processor elements 41 not to be updated. In addition, this signal causes data not to be input from the external port.

Thereafter, the state management section 31 reads "1" as an internal state number that is used when the operation is resumed.

The configuration rewrite section 33 rewrites contents of the configuration information memory 44, the state management section 31, and the configuration number converting section 32. In this case, the configuration rewrite section 33 uses real number "1" that has not been used.

The configuration rewrite section 33 obtains configuration information with logical number "2" from the external memory 5 and writes the configuration information to the configuration information memory 44. In addition, the configuration rewrite section 33 writes information about logical number "2" of the transition destination to the entry with real number "1" of the state management section 31, and writes logical number "2" to the entry with real number "1" of the configuration number converting section 32.

In this case, it is assumed that the configuration rewrite section 33 needs to perform the rewrite operation for 100 cycles.

After the configuration rewrite section 33 has completed the rewrite operation in the 102nd cycle, the configuration number converting section 32 sends real number "1" corresponding to logical number "2" to the real number register 34. Moreover, the state management section 31 stops issuing the WE cancellation signal and causes the group of processor elements 41 to resume the operation from the next cycle.

In the 103rd cycle, the processor elements 41 each execute the process for logical number—internal state number "2-1". FIG. 16C shows a look-up table with which the state management section 31 is provided at this point. In the 103rd cycle, real number "1" is written into the real number register 34 and the state management section 31 outputs internal state number "1." The configuration information memory 44 is notified of real number "1" stored in the real number register 34, then the corresponding configuration information is read, and thereby the relationship between the operations of the individual processor elements 41 and the connections of switches is decided. In addition, the individual processor elements 41 are notified of internal state number "1" and the operation of part of computation units is decided. As a result, each processor element 41 executes a predetermined computation.

The corresponding real number supplementary section 36 selects one of the event signals that are "invalid" from the corresponding real number storage section 35. In this case, it is assumed that the corresponding real number supplementary section 36 has selected event signal B.

The corresponding real number supplementary section 36 notifies the configuration number converting section 32 of logical number "4" corresponding to event signal B that has been selected in preference to others. The configuration number converting section 32 tries to convert logical number "4" into a real number; however, it fails.

When the state management section 31 is notified that each of the processor elements 41 generate a result designated as event signal A, since the event signal A does not match the event signal B that the corresponding real number supplementary section 36 has selected, the state management section 31 decides logical number "3" of the next state corresponding to the current real number "1" and event signal A based on the look-up table generated corresponding to the state transition chart. At the same time, the state management section 31 reads "invalid" value from the corresponding storage location of the corresponding real number storage section 35.

Although the corresponding real number supplementary section 36 has selected event signal B and the converting result, which was notified to the configuration number converting section 32, was "failed," since the event signal that the corresponding real number supplementary section 36 has selected does not match the event signal that has been issued corresponding to the computational results of the individual processor elements 41, the configuration number converting section 32 does not request the configuration rewrite section 33 to rewrite logical number "4."

Since "invalid" is read from the corresponding storage location of the corresponding real number storage section 35, the state management section 31 continuously issues the WE cancellation signal that causes the group of processor elements 41 to stop their operations in the 104th and later cycles. This signal causes registers of the processor elements 41 not to be updated. In addition, this signal causes data not to be input from the external port.

Thereafter, the state management section 31 reads "1" as the internal state number that is used when the operation is resumed.

In the 104th cycle, the state management section 31 notifies the configuration number converting section 32 of logical number "3" of the next state.

The configuration number converting section 32 tries to convert logical number "3" into a real number based on the look-up table. In this case, since configuration information with logical number "3" has not been stored in the configuration information memory 44, the configuration number converting section 32 fails to convert the logical number into a real number. In this case, since configuration information stored in the configuration information memory 44 needs to be rewritten, the configuration number converting section 32 notifies the configuration rewrite section 33 of logical number "3" of the next transition destination and requests the configuration rewrite section 33 to rewrite configuration information stored in the configuration information memory 44.

The configuration rewrite section 33 rewrites the contents of the configuration information memory 44, the state management section 31, and the configuration number converting section 32. In this case, the configuration rewrite section 33 uses real number "2" that has not been used.

The configuration rewrite section 33 obtains configuration information with logical number "3" from the external memory 5 and writes the configuration information to the configuration information memory 44. In addition, the configuration rewrite section 33 writes information about logical number "3" of the transition destination into the entry with real number "2" of the state management section 31, and writes logical number "3" into the entry with real number "2" of the configuration number converting section 32.

In this case, it is assumed that the configuration rewrite section 33 needs to perform the rewrite operation for 100 cycles.

After the configuration rewrite section 33 has completed the rewrite operation in the 204th cycle, the configuration number converting section 32 sends real number "2" corresponding to logical number "3" to the real number register 34. Moreover, the state management section 31 stops issuing the WE cancellation signal and causes the group of processor elements 41 to resume the operation from the next cycle.

In the 205th cycle, the processor elements 41 each execute the process for logical number—internal state number "3-1". FIG. 16D shows a look-up table with which the state management section 31 is provided at this point. In the 205th cycle, real number "2" is written to the real number register 34 and the state management section 31 outputs internal state number "1." The configuration information memory 44 is notified of real number "2" stored in the real number register 34, then the corresponding configuration information is read, and thereby the relationship between the operations of the individual processor elements 41 and the connections of switches is decided. In addition, the individual processor elements 41 are notified of internal state number "1" and the operation of part of computation units is decided. As a result, each processor element 41 executes a predetermined computation.

The corresponding real number supplementary section 36 selects one of the event signals that are "invalid" from the corresponding real number storage section 35. In this case, it is assumed that the corresponding real number supplementary section 36 has selected event signal A.

The corresponding real number supplementary section 36 notifies the configuration number converting section 32 of logical number "3" corresponding to event signal A that has been selected in preference to others. The configuration number converting section 32 converts logical number "3" into real number "2" and notifies the real number register 34 and the state management section 31 of real number "2."

When the state management section 31 is notified that each of the processor elements 41 generate a result designated as event signal A, since this event signal A matches the event signal A that the corresponding real number supplementary section 36 has selected and that the configuration number converting section 32 has succeeded in converting a logical number into a real number, the real number register 34 holds real number "2" notified by the configuration number converting section 32. In addition, the state management section 31 stores real number "2" of the transition destination in a corresponding storage location of the corresponding real number storage section 35 and stores information that represents "valid" value in the storage location. Moreover, the state management section 31 reads internal state number "1" of the next cycle.

In the 206th cycle, the computation section 4 executes the process for logical number—internal state number "3-1". FIG. 16E shows a look-up table with which the state management section 31 is provided at this point. In the 206th cycle, real number "2" is written to the real number register 34 and the state management section 31 outputs internal state number "1." The configuration information memory 44 is notified of real number "2" stored in the real number register 34, then the corresponding configuration information is read, and thereby the relationship between the operations of the individual processor elements 41 and the connections of switches is decided. In addition, the individual processor elements 41 are notified of internal state number "1" and the operation of part of computation units is decided. As a result, each processor element 41 executes a predetermined computation.

The corresponding real number supplementary section 36 selects one of the event signals that are "invalid" from the corresponding real number storage section 35. In this case, it is assumed that the corresponding real number supplementary section 36 has selected event signal B.

The corresponding real number supplementary section 36 notifies the configuration number converting section 32 of logical number "6" corresponding to event signal B that has been selected in preference to others. The configuration number converting section 32 tries to convert logical number "6" into a real number; however, it fails.

When the state management section 31 is notified that each of the processor elements 41 generate a result designated as event signal A, since the event signal A does not match the event signal B that the corresponding real number supplementary section 36 has selected, the state management section 31 decides logical number "3" of the next state corresponding to the current real number "2" and event signal A based on the look-up table generated corresponding to the state transition chart. At the same time, the state management section 31 reads real number "2" that is valid from the corresponding storage location of the corresponding real number storage section 35.

Since the result in which the information was read from the corresponding storage location of the corresponding real number storage section 35 is "valid," the state management section 31 writes real number "2" into the real number register 34 and reads internal state number "1" of the next cycle.

Although the corresponding real number supplementary section 36 has selected event signal B and the converting result, which was notified to the configuration number converting section 32, was "failed," since the event signal that the corresponding real number supplementary section 36 has selected does not match the event signal that has been issued corresponding to the computational results of the individual processor elements 41, the configuration number converting section 32 does not request the configuration rewrite section 33 to rewrite logical number "6."

In the 207th cycle, the computation section 4 executes the process for logical number—internal state number "3-1". The look-up table with which the state management section 31 is provided does not vary from the 206th cycle shown in FIG. 16E. In the 207th cycle, real number "2" is written into the real number register 34 and the state management section 31 outputs internal state number "1." The configuration information memory 44 is notified of real number "2" stored in the real number register 34, then the corresponding configuration information is read, and thereby the relationship between the operations of the individual processor elements 41 and the connections of switches is decided. In addition, the individual processor elements 41 are notified of internal state number "1" and the operation of part of computation units is decided. As a result, each processor element 41 executes a predetermined computation.

Although the corresponding real number supplementary section 36 selects one of the event signals that are "invalid" from the corresponding real number storage section 35, since there is no entry that is "invalid," the corresponding real number supplementary section 36 does not execute the process.

When the state management section 31 is notified that each of the processor elements 41 generate a result designated as event signal B, the state management section 31 decides logical number "6" of the next state corresponding to the current real number "2" and event signal A based on the look-up table generated corresponding to the state transition chart. At the same time, the state management section 31 reads "invalid" value from the corresponding storage location of the corresponding real number storage section 35.

Since "invalid" value is read from the corresponding storage location of the corresponding real number storage section 35, the state management section 31 continuously issues the WE cancellation signal that causes the group of processor elements 41 to stop their operations in the 208th and later cycles. This signal causes registers of the processor elements 41 not to be updated. In addition, this signal causes data not to be input from the external port. Moreover, the state management section 31 reads "1" as an internal state number that is used when the operation is resumed.

In the 208th cycle, the state management section 31 notifies the configuration number converting section 32 of logical number "6" of the next state.

The configuration number converting section 32 tries to convert logical number "6" into a real number based on the look-up table. In this case, since configuration information with logical number "6" has not been stored in the configuration information memory 44, the configuration number converting section 32 fails to convert the logical number into a real number. Thus, the configuration number converting section 32 requests the configuration rewrite section 33 to rewrite configuration information with logical number "6" into the configuration information memory 44.

The configuration rewrite section 33 rewrites contents of the configuration information memory 44, the state management section 31, and the configuration number converting section 32. In this case, the configuration rewrite section 33 uses real number "3" that has not been used.

The configuration rewrite section 33 obtains configuration information with logical number "6" from the external memory 5 and writes the configuration information into the configuration information memory 44. In addition, the configuration rewrite section 33 writes information about logical number "6" of the transition destination into the entry with real number "3" of the state management section 31, and writes logical number "6" into the entry with real number "3" of the configuration number converting section 32.

After the configuration rewrite section 33 has completed the rewrite operation in the 308th cycle, the configuration number converting section 32 sends real number "3" corresponding to logical number "6" to the real number register 34. Moreover, the state management section 31 stops issuing the WE cancellation signal and causes the group of processor elements 41 to resume the operation from the next cycle.

FIG. 16F shows a look-up table with which the state management section 31 is provided when transitions occur in the order of logical number—internal state number sets "6-1"→"6-1"→"10-1"→"10-1"→"1-1" and then logical number—internal state number "1-1" returns to "2-1."

If a transition occurs from logical number—internal state number set "2-1" to "3-1" again, since the corresponding real number storage section 35 has stored real numbers that are used in state transitions to "1-1," the operation can be performed without the configuration number converting section 32.

Next, an operation performed when logical number—internal state number set "1-1" returns to "2-1" will be described.

In this case, real number "5" is written into the real number register 34 and the state management section 31 outputs internal state number "1." Thus, the configuration information memory 44 of each processor element 41 of the computation section 4 is notified of real number "5," then corresponding configuration information is read therefrom, and thereby the relationship between the operations of the individual processor elements 41 and connections of switches is decided. In addition, each processor element 41 is notified of internal state number "1" and the operations of part of the computation units are decided. As a result, each processor element 41 executes a predetermined computation.

On the other hand, the corresponding real number supplementary section 36 selects one of the event signals that are "invalid" from the corresponding real number storage section 35. In this case, it is assumed that the corresponding real number supplementary section 36 has selected event signal B. The corresponding real number supplementary section 36 notifies the configuration number converting section 32 of logical number "1" corresponding to event signal B that has been selected in preference to others. The configuration number converting section 32 converts logical number "1" into real number "5" and notifies the real number register 34 and the state management section 31 of real number "5."

When the state management section 31 is notified that each of the processor elements 41 generate a result designated as event signal A, this event signal A does not match event signal B that the corresponding real number supplementary section 36 has selected. However, since the configuration number converting section 32 has succeeded in converting a logical number into a real number, the state management section 31 stores real number "5" into an entry of the corresponding real number storage section 35 identified by real number "5" and event signal B and also stores information that represents "valid" value into the storage location. FIG. 16G shows a look-up table with which the state management section 31 is provided at this point.

The state management section 31 that has detected that event signals are inconsistent with each other decides logical number "2" of the next state corresponding to the current real number "5" and event signal A based on the look-up table generated corresponding to the state transition chart. In addition, the state management section 31 reads valid real number "1" from an entry of the corresponding real number storage section 35 identified by the current real number "5" and by event signal A and writes real number "1" to the real number register 34.

In addition, the state management section 31 reads internal state number "1" of the next cycle from the corresponding real number storage section 35.

Likewise, a loop of transitions from logical number—internal state number set "1-1" to "2-1" and from "2-1" to "3-1" is repeated so as to rewrite entries of the corresponding real number storage section 35 identified by real number "5" and event numbers C and D from "invalid" to real number "0." FIG. 16H shows a look-up table with which the state management section 31 is provided after the entries are rewritten.

Thereafter, when transitions occur from "2-1" to "4-1" and then to "7-1," since the state management section 31 reads "invalid" value from the corresponding real number storage section 35 and the configuration number converting section 32 fails to convert a logical number into a real number, the configuration rewrite section 33 performs the rewrite operation. FIG. 16I shows a look-up table with which the state management section 31 is provided when transitions occur from "7-1" to "10-1" to "12-1", to "2-1", and then to "4-1."

Here, the operation in the case in which transitions occur from "4-1" to "8-1" will be described.

In this case, "invalid" is read from the corresponding real number storage section 35 corresponding to the current real number "1" and event signal C. In this case, since the configuration number converting section 32 fails to convert logical number "5" into a real number in the next cycle, the configuration number converting section 32 requests the configuration rewrite section 33 to write configuration information with logical number "8" into the configuration information memory 44.

The configuration rewrite section 33 rewrites the contents of the configuration information memory 44, the state management section 31, and the configuration number converting section 32. In this case, since there is no unused real number, it is necessary to decide a location to which configuration information with logical number "8" is written. In this case, logical number "10" is deleted.

If logical number "10" corresponding to real number "4" of the configuration information memory 44 is deleted, an entry with a transition to real number "4" of the corresponding real number storage section 35 will be invalidated. In this case, an entry identified by real number "3" and event signal B and an entry identified by real number "3" and event signal B become candidates. Although an entry identified by real number "4" and event signal A also becomes a candidate, since all the content with real number "4" is deleted, it is not necessary to explicitly invalidate only the content of the corresponding real number storage section 35.

After a particular entry of the corresponding real number storage section 35 is invalidated, the content corresponding to real number "0" is deleted from the configuration information memory 44, the state management section 31, and the configuration number converting section 32 and the content with logical number "4" is newly written thereto. FIG. 16J shows a look-up table with which the state management section 31 is provided after the content is written.

It is assumed that when a transition occurs from "8-1" to "11-1," real number "3" is rewritten to logical number "11." FIG. 16K shows a look-up table with which the state management section 31 is provided after the rewrite operation is performed.

If transitions occur from "1-1" to "2-1" and then from "2-1" to "3-1" to "6-1," configuration information with logical number "6" is written again. In this case, it is assumed that configuration information with logical number "6" is rewritten to real number "4" unlike the foregoing case. FIG. 16L shows a look-up table with which the state management section 31 is provided at this point.

FIG. 16M shows a look-up table with which the state management section 31 is provided when configuration information with logical number "10" is written to real number "3" and a transition to "10-1" occurs. At this point, an entry of the corresponding real number storage section 35 corresponding to real number "7" and event signal A is kept invalid. This corresponding storage location is blank until a transition to "7-1" occurs.

Thereafter, likewise, for transitions that have been executed and in which transition sources and transition destinations have not been deleted, the state management section 31 reads the content of the corresponding real number storage section 35 and directly writes the content into the real number register 34. On the other hand, for transitions that have not been executed, as long as configuration information of the transition destination of the current state has been written, the corresponding real number supplementary section 36 supplements the contents of the corresponding real number storage section 35.

According to this example, since a process corresponding to the next logical number can be performed immediately in the next cycle, the number of cycles necessary to execute the process is decreased as compared to the first example and thereby processing performance is improved.

Third Example

A third example is an example of which the foregoing sixth exemplary embodiment is applied to the data processing device according to the foregoing Prior Art Invention 1 (Japanese Patent Application No. 2006-103987).

Figure 17:
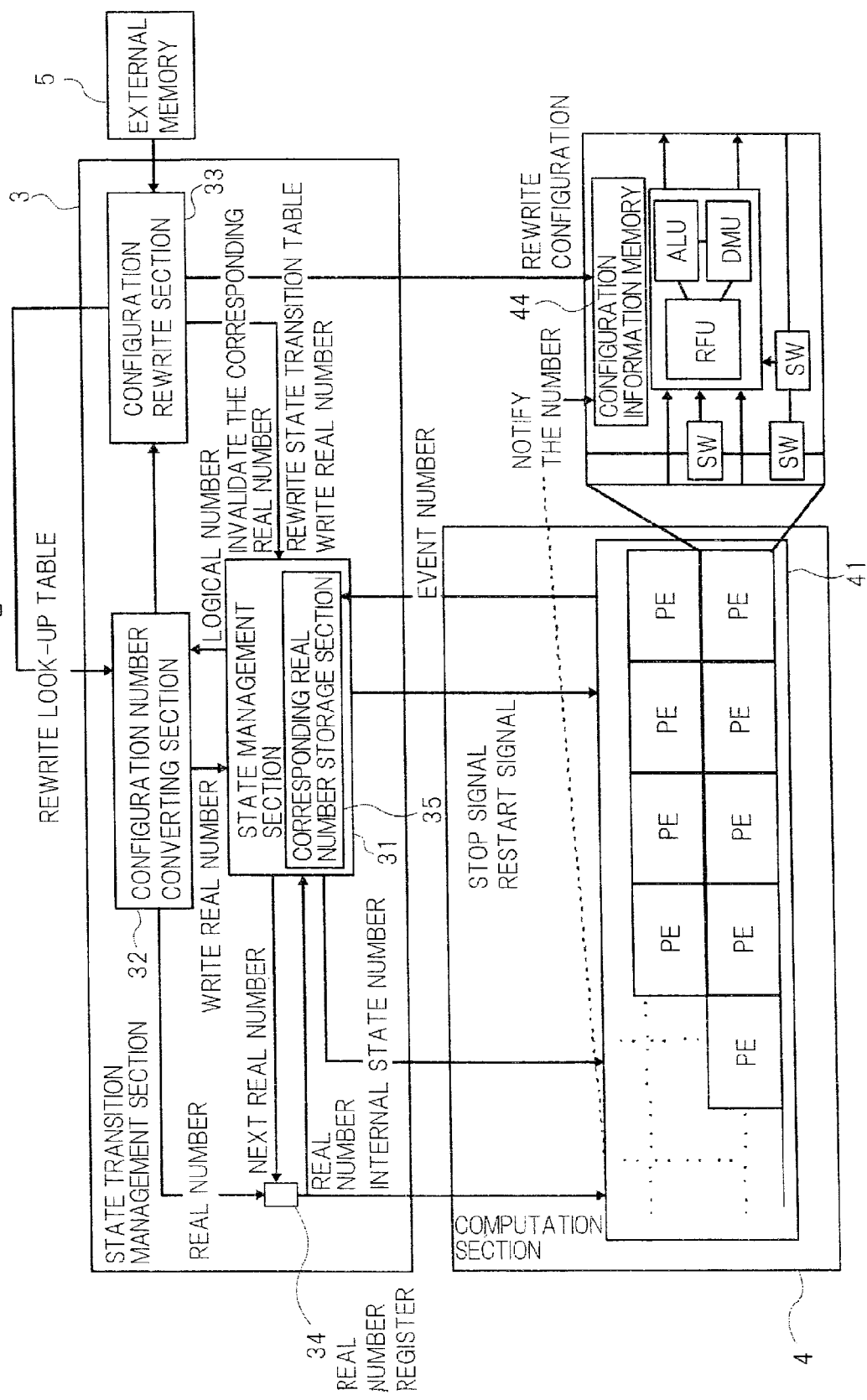
FIG. 17 is a block diagram showing the structure of a data processing device according to a third example.

FIG. 17 is a block diagram showing the structure of a data processing device according to the third example.

Third example is an example in which the function of the corresponding real number supplementary section 36 according to the second example is accomplished by the configuration rewrite section 33.

The configuration rewrite section 33 is provided with a list that tabulates logical numbers, entries of the state management section 31, and transition destinations and updates the list when it rewrites configuration information.

Although the corresponding real number supplementary section 36 according to the second example supplements only an entry of the corresponding real number storage section 35 with the current real number, the configuration rewrite section 33, according to this example, performs a write operation for configuration information such that the configuration rewrite section 33 supplements an entry of the corresponding real number storage section 35 with configuration information with a real number that is written immediately after the operation is resumed, and then supplements entries of the corresponding real number storage section 35 with configuration information with other real numbers.

Except for the foregoing description, since the structure of the third example is the same as that of the second example, description will be omitted.

In addition, the operation of the data processing device according to the third example is the same as the data processing device according to the second example until the state shown in FIG. 16M occurs. However, in the second example, if a transition to a particular real number occurs, whenever the entry of the corresponding real number storage section 35 with the real number is "invalid," the corresponding real number supplementary section 36 always operates. In contrast, in the third example, the configuration rewrite section 33 supplements an entry of the corresponding real number storage section 35 with a real number only immediately after the configuration rewrite section 33 rewrites configuration information.

After the same computations as those of the second example are performed, when the configuration rewrite section 33 writes configuration information with logical number "10" of the next transition destination to real number "3" and a state shown in FIG. 16M occurs, the configuration rewrite section 33 refers to a list of entries whose transition destination is logical number "10" and writes real number "3" corresponding to logical number "10" of the transition destination into an entry of the corresponding real number storage section 35 identified by real number "7" and event signal A.

According to this example, if a transition occurs from a plurality of logical numbers to a particular logical number and configuration information with the logical number of the transition source has been written into the configuration information memory, wasteful operations can be reduced as compared to the second example.

Now, with reference to the exemplary embodiments, the present invention has been described. However, it should be understood by those skilled in the art that the structure and details of the present invention may be changed in various manners without departing from the scope of the present invention.

This application is based upon and claims the benefit of priority from Japanese patent application No. 2009-194074, filed on Aug. 25, 2009, the disclosure of which is incorporated herein in its entirety by reference.

The invention claimed is:

1. A data processing device that includes a plurality of computation units and an interconnect section that changes connections of said computation units and that is capable of changing circuits that execute a variety of processes corresponding to an object code composed of at least one piece of configuration information containing information that represents the relationship between computation instructions for said computation units and connections of said computation units, comprising:
 a state management section that decides a logical number that represents information of the mutual relationship between individual pieces of configuration information contained in said object code, the logical number being used in the next operation state, based on a current operation state, a candidate group of a next transition state, and an event signal issued by each of said computation units;
 a configuration number converting section that stores converting information based on which said logical number is converted into a real number that represents a real storage location of said configuration information corresponding to said logical number and that outputs a real number corresponding to a logical number decided by said state management section;
 a configuration information storage section that stores said configuration information and notifies said computation units and said interconnect section of configuration information corresponding to a real number that is output from said configuration number converting section; and
 a corresponding real number storage section that stores a real number corresponding to a logical number along with information that represents valid value, the logical number being decided by said state management section based on the current operation state, the candidate group of the next transition state, and the event signal issued by each of said computation units,
 wherein after a configuration rewrite section writes configuration information into said configuration information storage section, said state management section updates and validates said corresponding real number storage section.

2. The data processing device according to claim 1, wherein said state management section has an internal state number as the current operation state besides a logical number and notifies said computation units and said interconnect section of the internal state number along with said configuration information.

3. The data processing device according to claim 2, wherein when an event signal is input to said state management section, it decides the next logical number, reads the content of said corresponding real number storage section, and when the content of said corresponding real number storage section is valid, outputs a real number to said configuration information storage section.

4. The data processing device according to claim 1, wherein when an event signal is input to said state management section, it decides the next logical number, reads content of said corresponding real number storage section, if the content of said corresponding real number storage section is invalid, outputs the logical number to said configuration number converting section, and stores the real number received from said configuration number converting section into said corresponding real number storage section.

5. The data processing device according to claim 4, wherein if said corresponding real number storage section stores a logical number whose a real number corresponding thereto is invalid, said state management section outputs a logical number to said configuration number converting section that is not based on an event signal issued by each of said computation units and writes a real number received from said configuration number converting section into said corresponding real number storage section.

6. The data processing device according to claim 1, wherein when a configuration rewriting section deletes configuration information stored in said configuration information storage section, said state management section invalidates a real number of the configuration information to be deleted from said corresponding real number storage section.

7. The data processing device according to claim 2, wherein when an event signal is input to said state management section, it decides the next logical number, reads content of said corresponding real number storage section, if the content of said corresponding real number storage section is invalid, outputs the logical number to said configuration number converting section, and stores the real number received from said configuration number converting section into said corresponding real number storage section.

8. The data processing device according to claim 3, wherein when an event signal is input to said state management section, it decides the next logical number, reads content of said corresponding real number storage section, if the content of said corresponding real number storage section is invalid, outputs the logical number to said configuration number converting section, and stores the real number received from said configuration number converting section into said corresponding real number storage section.

9. The data processing device according to claim 2, wherein after a configuration rewrite section writes configuration information into said configuration information storage section, said state management section updates and validates said corresponding number storage section.

10. The data processing device according to claim 3, wherein after a configuration rewrite section writes configuration information into said configuration information storage section, said state management section updates and validates said corresponding number storage section.

11. The data processing device according to claim 4, wherein after a configuration rewrite section writes configuration information into said configuration information storage section, said state management section updates and validates said corresponding number storage section.

12. The data processing device according to claim 5, wherein after a configuration rewrite section writes configuration information into said configuration information storage section, said state management section updates and validates said corresponding number storage section.

13. The data processing device according to claim 2, wherein when a configuration rewriting section deletes configuration information stored in said configuration information storage section, said state management section invalidates a real number of the configuration information to be deleted from said corresponding real number storage section.

14. The data processing device according to claim 3,
wherein when a configuration rewriting section deletes configuration information stored in said configuration information storage section, said state management section invalidates a real number of the configuration information to be deleted from said corresponding real number storage section.

15. The data processing device according to claim 4,
wherein when a configuration rewriting section deletes configuration information stored in said configuration information storage section, said state management section invalidates a real number of the configuration information to be deleted from said corresponding real number storage section.

16. The data processing device according to claim 5,
wherein when a configuration rewriting section deletes configuration information stored in said configuration information storage section, said state management section invalidates a real number of the configuration information to be deleted from said corresponding real number storage section.

17. The data processing device according to claim 1,
wherein when a configuration rewriting section deletes configuration information stored in said configuration information storage section, said state management section invalidates a real number of the configuration information to be deleted from said corresponding real number storage section.

18. The data processing device according to claim 7,
wherein after a configuration rewrite section writes configuration information into said configuration information storage section, said state management section updates and validates said corresponding number storage section.

19. The data processing device according to claim 8,
wherein after a configuration rewrite section writes configuration information into said configuration information storage section, said state management section updates and validates said corresponding number storage section.

* * * * *